(12) United States Patent
White

(10) Patent No.: US 9,938,670 B2
(45) Date of Patent: Apr. 10, 2018

(54) PERMEABLE PAVING SYSTEM

(71) Applicant: Charles R. White, Worton, MD (US)

(72) Inventor: Charles R. White, Worton, MD (US)

(*) Notice: Subject to any disclaimer, the term of this patent is extended or adjusted under 35 U.S.C. 154(b) by 0 days.

(21) Appl. No.: 14/208,287

(22) Filed: Mar. 13, 2014

(65) Prior Publication Data
US 2014/0270944 A1 Sep. 18, 2014

Related U.S. Application Data

(60) Provisional application No. 61/783,162, filed on Mar. 14, 2013.

(51) Int. Cl.

| | |
|---|---|
| *E01C 3/00* | (2006.01) |
| *E01C 3/06* | (2006.01) |
| *E01C 5/00* | (2006.01) |
| *E01C 11/22* | (2006.01) |
| *E01C 19/50* | (2006.01) |
| *E01C 19/52* | (2006.01) |
| *E01C 23/01* | (2006.01) |

(52) U.S. Cl.
CPC ............ *E01C 3/06* (2013.01); *E01C 5/001* (2013.01); *E01C 5/003* (2013.01); *E01C 11/224* (2013.01); *E01C 19/502* (2013.01); *E01C 19/52* (2013.01); *E01C 23/01* (2013.01)

(58) Field of Classification Search
CPC ............. E01C 5/00; E01C 5/001; E01C 5/003
USPC ............................ 404/29, 34, 41; 210/170.03
See application file for complete search history.

(56) References Cited

U.S. PATENT DOCUMENTS 1,773,417 A * 8/1930 Whitacre .................. C02F 3/10
 210/293
2,583,990 A * 1/1952 Baumer .............. E04G 21/1808
 33/404

(Continued)

FOREIGN PATENT DOCUMENTS

WO WO 2011007128 A1 * 1/2011

OTHER PUBLICATIONS

International Search Report issued in corresponding International Patent Application No. PCT/US14/25798 dated Aug. 5, 2014.

*Primary Examiner* — Thomas B Will
*Assistant Examiner* — Katherine J Chu
(74) *Attorney, Agent, or Firm* — Whiteford, Taylor & Preston, LLP; Peter J. Davis

(57) ABSTRACT

A permeable paving system having a base layer and a paving layer, in which the base layer is made of a plurality of substantially hollow structural modules having a rigid bottom wall and a substantially parallel to a rigid top wall retained in a fixed space relationship from each other by a plurality of spacers, in which the structural module has a plurality of side walls extending between the perimeters of the top wall and the bottom wall, in which the top and bottom walls have apertures to allow movement of fluids into and out of the structural modules, and in which the top wall has a plurality of guide lines configured for alignment of paving material, and/or as a guide for cutting the structural module. Alternatively, instead of guide lines, there may be string line posts connectable to an element of the permeable paving system configured to extend above the top wall of said structural module and configured for establishing elevations of paving materials, and/or alignment of paving materials.

11 Claims, 22 Drawing Sheets

(56) References Cited

U.S. PATENT DOCUMENTS

| | | | | |
|---|---|---|---|---|
| 3,427,936 A | * | 2/1969 | Van Der Meijden | 404/73 |
| 4,047,825 A | * | 9/1977 | Lundahl | E01C 5/001 404/37 |
| 5,030,343 A | * | 7/1991 | Urriola | E01F 5/00 210/170.03 |
| 5,373,661 A | * | 12/1994 | Furukawa | E01C 13/02 47/18 |
| 5,437,698 A | | 8/1995 | Furukawa | |
| 5,692,348 A | * | 12/1997 | Ambrosino | E04L 31/70 405/43 |
| 5,916,104 A | * | 6/1999 | Lucenet et al. | 52/791.1 |
| 6,079,902 A | * | 6/2000 | Pettee, Jr. | E02B 3/14 404/35 |
| 6,184,496 B1 | | 2/2001 | Pearce | |
| 6,540,435 B1 | * | 4/2003 | Lizarraga | 404/98 |
| 6,736,569 B2 | * | 5/2004 | Lee | E02B 11/00 405/43 |
| 6,779,946 B1 | * | 8/2004 | Urriola | E01C 9/004 404/2 |
| 7,344,334 B2 | | 3/2008 | Thorkelson | |
| 7,429,144 B1 | * | 9/2008 | Lai | E01C 9/004 404/34 |
| 7,704,011 B2 | | 4/2010 | Marshall | |
| 7,914,228 B2 | * | 3/2011 | Rapaz | E01O 5/005 404/34 |
| 8,282,310 B2 | | 10/2012 | White | |
| 8,555,586 B2 | * | 10/2013 | Lowe | E03F 1/005 210/170.03 |
| 8,696,241 B2 | * | 4/2014 | Lee | E01C 13/083 404/36 |
| 8,790,037 B2 | * | 7/2014 | Culleton et al. | 404/29 |
| 9,010,060 B2 | * | 4/2015 | Rapaz | E04C 2/34 428/133 |
| 2003/0082359 A1 | * | 5/2003 | Scott | E01C 13/02 428/221 |
| 2004/0006935 A1 | * | 1/2004 | Moorhead | E01C 19/008 52/155 |
| 2007/0227094 A1 | * | 10/2007 | Oscar | B65D 90/023 52/630 |
| 2008/0276567 A1 | * | 11/2008 | Rapaz | 52/792.11 |
| 2009/0180833 A1 | | 7/2009 | Buch | |
| 2009/0266022 A1 | * | 10/2009 | Lin | 52/506.1 |
| 2010/0108617 A1 | * | 5/2010 | Schmidt | B01D 39/06 210/768 |
| 2010/0284740 A1 | * | 11/2010 | Sawyer et al. | 404/70 |
| 2012/0121328 A1 | * | 5/2012 | White | 404/73 |
| 2012/0141202 A1 | * | 6/2012 | Buch | 404/41 |
| 2013/0089372 A1 | * | 4/2013 | Ciccarello | E01C 5/06 404/2 |
| 2014/0105684 A1 | * | 4/2014 | Allard | E03F 1/005 405/52 |

* cited by examiner

PERMEABLE PAVING SYSTEM

CROSS-REFERENCE TO RELATED APPLICATIONS

This application is a claims the priority benefit under 35 U.S.C. § 119(e) of U.S. Provisional Application No. 61/783,162, entitled "PERMEABLE PAVING SYSTEM" filed Mar. 14, 2013, which is incorporated herein by reference in its entirety.

BACKGROUND OF THE INVENTION

Field of the Invention

The field of the invention relates to paving methods and more specifically to a permeable paving system for easy and accurate installation of permeable paved surfaces in a variety of materials.

Background

Paved surfaces are seen everywhere, whether they be on grass, gravel, soil, rooftops, or hardtop. These surfaces usually include pavers of various materials, cobblestones, asphalt, concrete slabs in various forms, and specialty products made from exotic materials. Moreover, the paved surfaces are arranged in recognizable patterns and/or follow a defined path. In all respects, these provide the individual and general public with an aesthetically appealing, and functional surface where the populace may walk, ride, or drive in relative comfort, but in most cases these surfaces are impervious. The US Environmental Protection Agency is actively promoting "Green Infrastructure" as a way to reduce the amount of impervious surfaces. Permeable surfaces reduce the amount of storm water runoff that carries with it pollutants, and floatables that get into the waterways. Over seven hundred US cities have combined storm water and sanitary sewer systems. Large rain events overload sanitary sewage treatment plants causing sewage spills that pollute the waterways. One element of "Green Infrastructure" is "Permeable Paving". This refers to a paving surface that allows storm water to pass through to a storage layer in the base where it can infiltrate into the soils below. If the soils do not percolate the water, or the desire is to retain the water, not infiltrate, the water can be conveyed out of the storage layer into an external drainage system, or used for rainwater harvesting. The paving surface can be porous asphalt, permeable concrete, permeable pavers, or any other surface material that allows water to pass through. Many of the impervious paved surfaces in municipalities are over infrastructure pipes and conduits that limit the depth of the storage layer. Paved surfaces, such as sidewalks, follow the terrain up and down changing the direction of slope of the paved surface accordingly.

While the end product or pavement may be functional and appealing, the process of installing the permeable paved surface is a time-consuming and inefficient task. Porous asphalt, permeable concrete, and the other types of permeable paving surfaces require most of the installation steps listed below, but the most time consuming permeable paving surface to install, and most costly, is pavers. For example, a typical permeable paver installation requires excavation to a desired depth, terracing sloped areas, removal of the excavated material, hauling and placement of the base aggregate material, installing an under drain or overflow pipe and connecting to an external drainage system, driving a plurality of stakes into the ground to set string lines to determine the proper elevation of the base aggregate, leveling the base aggregate, the compaction of the aggregate, driving a plurality of stakes to secure straight and flexible edging, the use of a pair of screed pipes on the surface of the compacted aggregate to establish the height of the bedding layer of aggregate, placing the bedding aggregate and leveling it by pulling a screed across the screed rails, setting a plurality of string lines to establish a guide for setting of the pavers in the desired pattern at the proper elevation using the string lines as guides, and installing stone chips in between the joints of the pavers. One solution to the above involves a structural module in U.S. Pat. No. 7,704,011B2 to Marshall, 2010, Apr. 27, which replaces the sub base aggregate. Due to the structural strength, and the increased water storage in a structural module versus stone, an installer gains the advantage of reducing the depth of excavation, and eliminating the sub base layer of aggregate. The structural module reduces the time and expense of excavation, purchasing sub base stone, hauling sub base stone, placing sub base stone, compacting sub base stone, and all types of permeable pavements can be used with it. The structural module does not address the problems of frequent measuring for setting stakes, or the driving of the stakes into the ground multiple times for placement of string lines, or the problem of a change in slope in the terrain of the area being paved, or the driving of spikes to secure straight or flexible edging. The structural module requires a plurality of surface paving layers, including a base layer of aggregate, be placed on top of it. This increases the overall thickness of the pavement structure which can be a problem when going over infrastructure piping, or where there is a high ground water table.

Another example involves an underlayment support layer of polymeric material in the form of panels that is porous as described in US Publication Number 2010/0284740 A1 to Sawyer. While this solution substantially reduces the time and expense of excavation, purchasing, hauling, placing, and compacting the base stone, the system does not provide for storage of water, or conveyance of water, or the problem of frequent measuring and driving stakes at the proper location for placement of string lines, or the driving of spikes to secure straight or flexible edging.

My previous U.S. Pat. No. 8,282,310B2, dated Oct. 9, 2012, discloses a paver installation system. However, that invention did not take into account the problem of slope in the terrain being paved, the problem of maintaining structural integrity of the grid after being cut by the installer, the problem of snow and ice accumulating on paved surfaces, the variety of permeable paving surface materials, or the problem of connecting under drain and/or overflow pipes to an external pipe system that may be connected to a drainage system or used for rain water harvesting.

Thus a permeable paving system solving the aforementioned problems is desired.

SUMMARY OF THE INVENTION

In accordance with one embodiment, a permeable paving system comprises a substantially hollow structure defining a base layer with a fluid storage area, and a surface that restricts the paving surface material, and/or aggregate from entering the fluid storage area of the substantially hollow structure, solves the problem of slope in the terrain to be paved, solves the problem of fluid conveyance out of the structure, solves the problem of maintaining structural integrity after being cut, solves the problem of snow and ice accumulating on the paved surface, solves the problem of the fluid storage area being too close to ground water or infrastructure piping near the surface, solves the problem of measuring multiple times to find the correct locations to drive string line stakes, and eliminates the stakes by providing guidelines for the placement of pavers or by providing an alternate method for attaching string lines.

Advantages

Accordingly several advantages of one or more aspects of the invention are as follows: to provide a permeable paving system that can be cut to adapt to various site dimensions without losing structural integrity, that can store, infiltrate, and/or easily convey fluids out of the system, that makes it easy to use the fluids for rainwater harvesting, that makes it easy to use the fluids for geothermal heating and cooling, that can be used with various types of permeable pavement surface materials, that easily accommodates a heat source for ice and/or snow melting, that is traffic rated when placed just below the pavement, that reduces the overall depth of the permeable pavement installation, that is relatively inexpensive to install, that increases the speed of installation of permeable pavements, that reduces the amount of labor for installation of permeable pavements, that provides a faster method to level the bedding aggregate, that provides a guide for aligning pavers, that interlocks and pivots to conform to slope in the terrain, that provides a way to slow down the flow of fluids and increase infiltration when used on a slope, that eliminates the need to drive stakes for setting string lines, that eliminates the need to drive spikes to secure straight or flexible edging, and that has a bottom design that does not sink into the sub base. These and other features of a preferred embodiment will become readily apparent upon further review of the following specification and drawings.

BRIEF DESCRIPTION OF THE DRAWINGS

Similar reference characters denote corresponding features consistently throughout the attached drawings.

Figure 1:
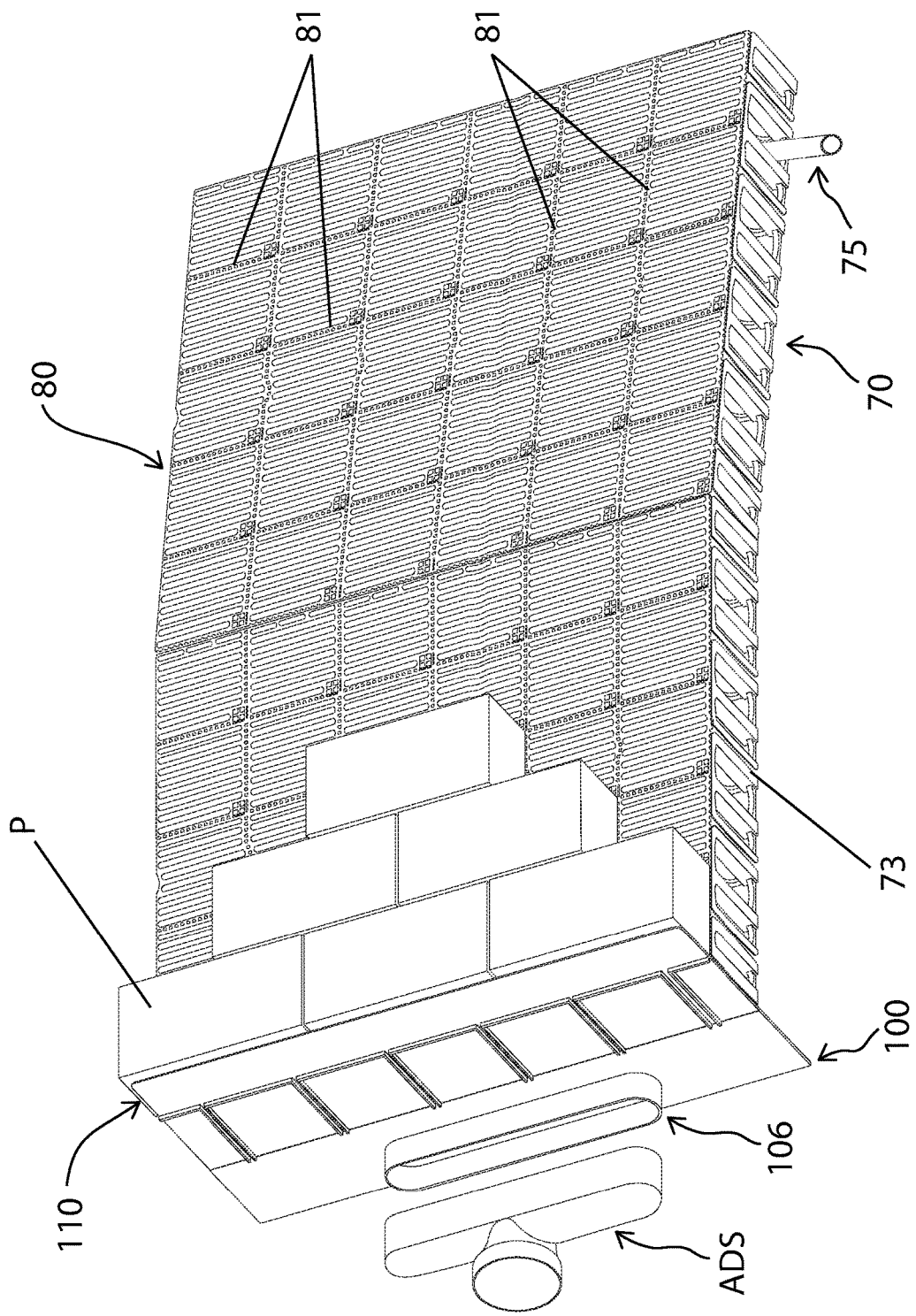
FIG. 1 is a perspective view of a first structural module on a level surface connected to a second structural module on a sloped surface according to an embodiment of a permeable paving system of the invention.
Figure 2:
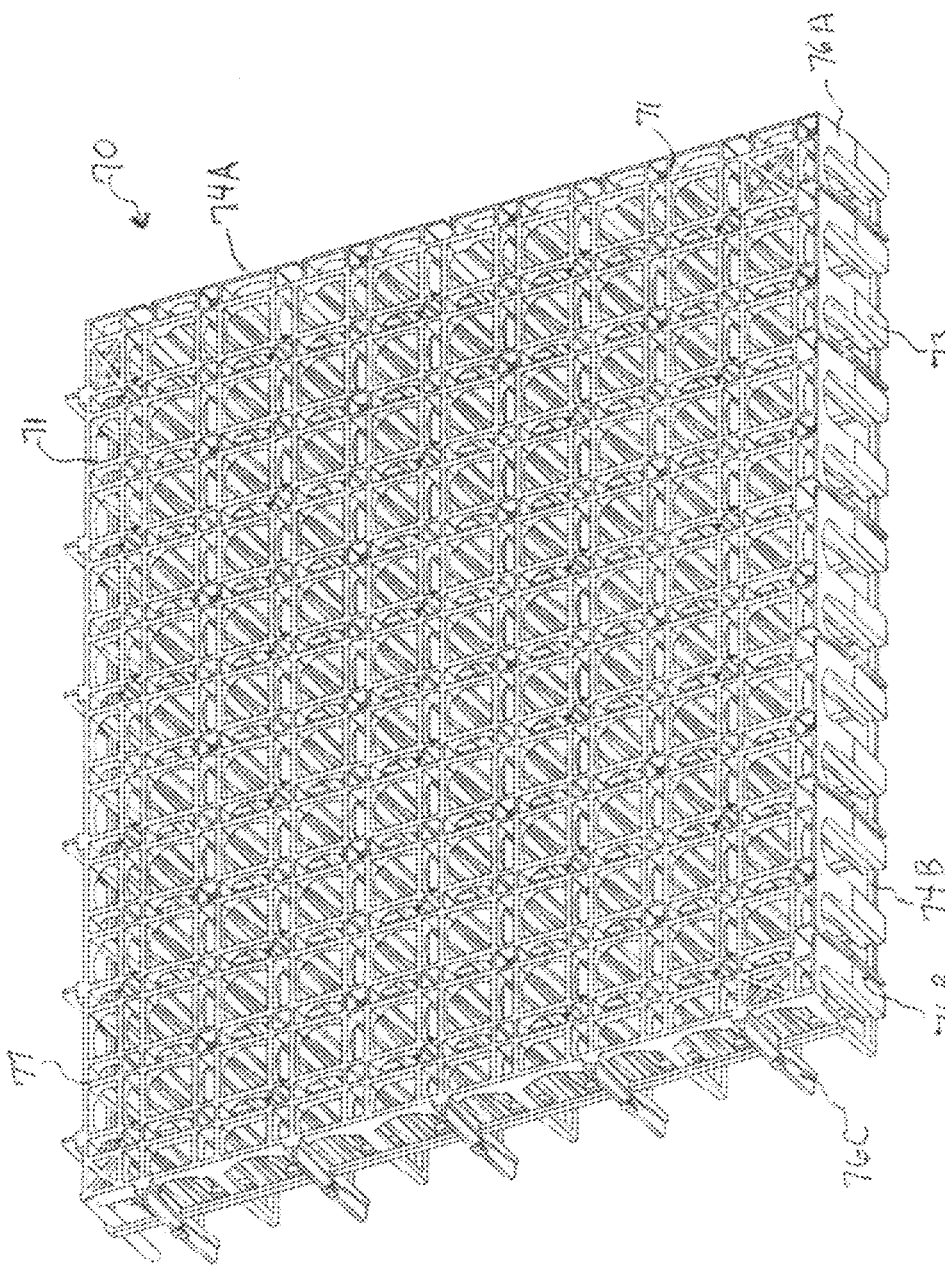
FIG. 2 is a perspective view of a structural module base for a permeable paving system in accordance with one embodiment.
Figure 3:
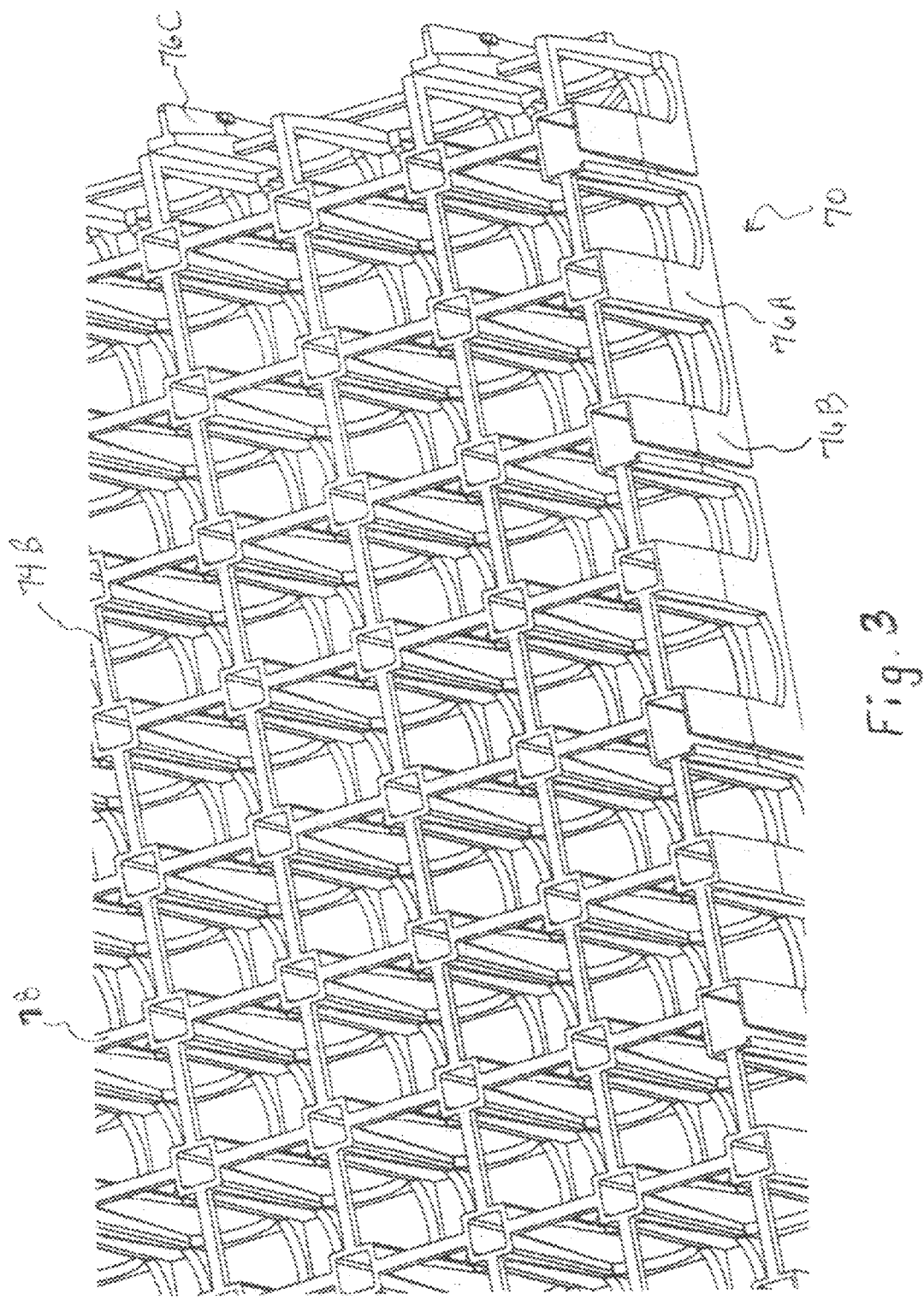
FIG. 3 is a perspective view of a partial underside view of a bottom wall of a structural module base, including a male interlock spacer and a female interlock spacer, according to an embodiment of a permeable paving system of the invention.

| DRAWINGS - REFERENCE NUMERALS | | | |
|---|---|---|---|
| 50 | flexible edging | 52 | flat strip |
| 54 | mounting | 55 | mounting hole |
| 70 | base | 71 | cut lines |
| 72A | shelf | 72B | lower mounting hole |
| 73 | side edge | 74A | top strut |
| 74B | bottom strut | 75 | slope dam |
| 76A | spacer | 76B | female spacer |
| 76C | male spacer | 77 | intermediate wall |
| 78 | bottom wall | 79 | interlock joint |
| 80 | top wall | 81 | guide line |
| 82A | handle recess | 82B | upper mounting hole |
| 84 | screed rail guide | 85 | screed rail |
| 86 | screed edge | 87 | top surface |
| 90 | pattern guide | 91 | flat beam |
| 92 | guide edge | 93 | bottom edge |
| 94 | fin | 95 | peg hole |
| 96 | mounting peg | 97 | leg |
| 98 | split top | 99 | handle |

-continued

| DRAWINGS - REFERENCE NUMERALS | | | |
|---|---|---|---|
| 100 | edge cover | 106 | adapter |
| 107 | female connector | 108 | male connector |
| 110 | straight edging | 112 | string line post |
| 114 | tie off stud | 116 | string line hole |
| 117 | post female connector | 118 | post male connector |

DETAILED DESCRIPTION OF THE INVENTION

Figure 4:
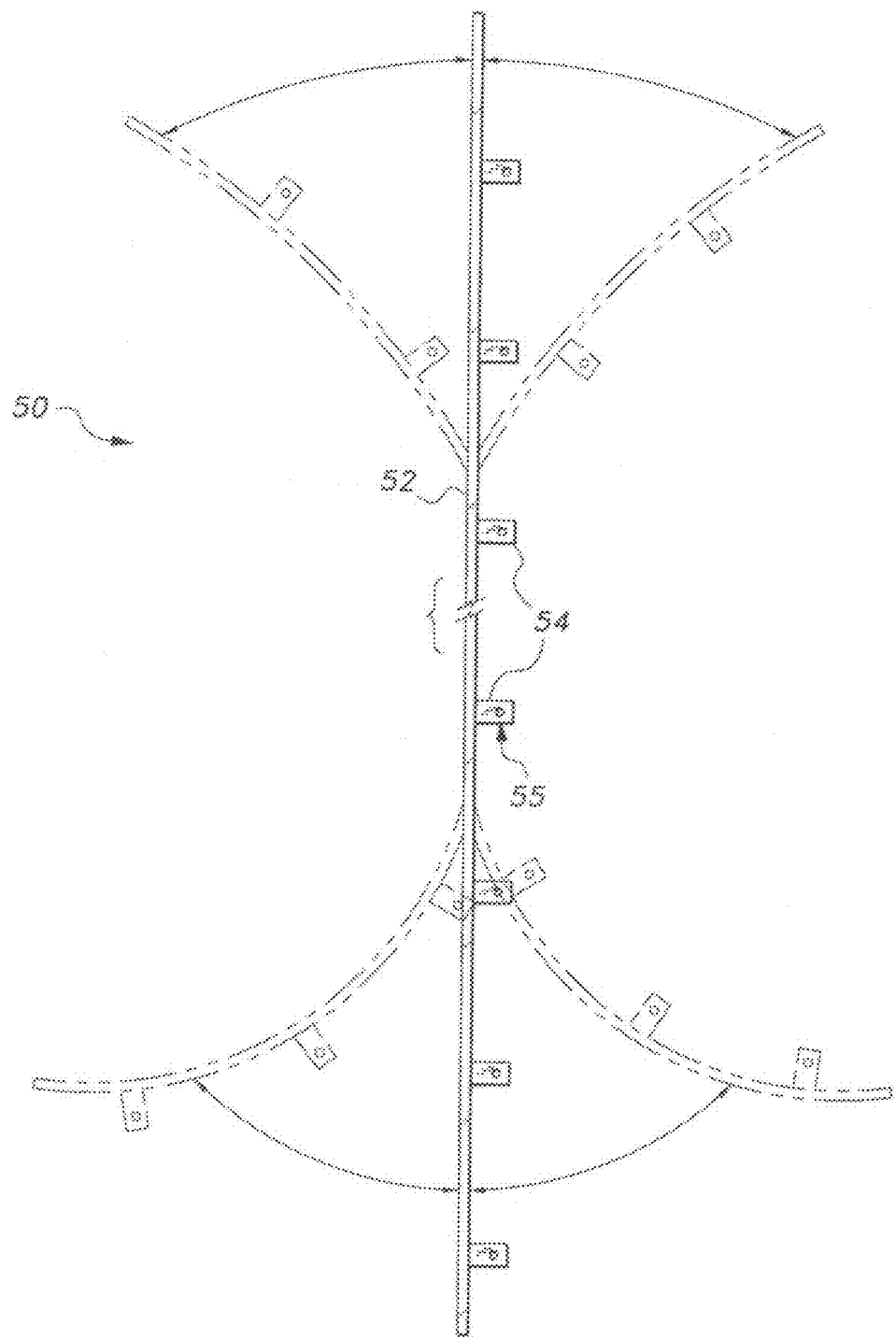
FIG. 4 is a top view of a flexible edging for the permeable paving system in accordance with one embodiment.

One embodiment of the permeable paving system is illustrated in FIG. 1 for easy and efficient installation of permeable paving for various applications such as pathways, sidewalks, patios, parking lots, driveways, roadways, medians, and pathways or terraces on roofs or decks etc. The permeable paving system may include a base 70, a top wall 80, a plurality of guide lines 81, and may also include a slope dam 75, an edge cover 100, with or without an adapter 106, and/or a straight edging 110, with or without the adapter 106. When the permeable paving material is placed on a radius, flexible edging 50 as shown in FIG. 4, may be fastened to the top wall 80.

The base 70 in this embodiment being the lower part of a structural module may be stackable and interlocking, and is preferably rated to handle repeated vehicle traffic. The base 70 includes open internal space for storage and movement of fluids. All exterior surfaces of base 70 are substantially open to allow fluids to flow into and out of the base 70 in all directions. Moreover the bottom surface design of the base 70 creates a stable base for vehicular traffic and preventing excessive settling of the paved surface. In this manner, the combination of fluid storage in a shallow profile and the stable structure of the base 70 permits the user to reduce the depth of the sub base material, or eliminate it, resulting in reduction of excavated material and disposal thereof, as well as the reduction in the amount of aggregate required for the permeable paving installation. In roof or deck applications the base 70 provides a very lightweight structure below pathways and terraces with a high void area for storage of fluids that may be used for rainwater harvesting. Soil may be placed in the base 70 when it is being used in a tree pit or other landscape application. A heat source such as a hydronic radiant system, an electric radiant system, or a hot air system may be placed in, or connected to the base 70 for melting of snow and/or ice on the paved surface. Other methods to heat the space in the structural module may be used.

As shown in FIGS. 1, 2, 3, and 13 the base 70 may be a rectangle with a pattern forming a grid like structure. This results in a lightweight and durable structure strong enough to handle years of wear. In this embodiment, the structure of the base 70 includes a plurality of square spacers or pillars 76A, a plurality of rectangular female spacers or pillars 76B, and a plurality of male spacers or posts 76C. The spacers 76A, 76B, and 76C may be positioned to allow fluids to flow between and around them. The spacers 76A, 76B, and 76C are interlaced by a plurality of relatively thin connecting top ties, rails, or struts 74A that form an intermediate wall 77, and a plurality of bottom ties, rails, or struts 74B that form a bottom wall 78. The perimeter edges of the intermediate wall 77, the perimeter edges of the bottom wall 78, and a plurality of perimeter spacers 76A, or 76B, or 76C, form a plurality of substantially open side edges 73. This creates a structure that will support vehicle loads by transferring the load from the top wall 80, through the intermediate wall 77, spacers 76A, 76B, 76C and bottom wall 78 to the sub base. The intermediate wall 77 provides structural support for the top wall 80. The intermediate wall 77 provides structural support when the base 70 is stacked upon another base 70. The bottom wall 78 rests on the sub base, which may have a generally flat, square, rectangular, or other 2-dimensional configuration and orientation in the form of a landscaping geogrid in order to create a snowshoe affect, and may prevent the base 70 from sinking into the sub base. The base 70 may sit on a sub base such as native soil, aggregates of various materials, or any material providing suitable support for the base 70. The base 70 may sit on an impermeable liner, a geotextile material, a geogrid, or other materials that may provide, or enhance the support provided by the sub base. Nylon fibers or similar materials may be mixed into the sub base material to add additional support. The impermeable liner may be placed under the base 70 and around the perimeter side edges 73 when storing fluids in the base 70 for rainwater harvesting, geothermal heating and/or cooling, or similar fluid reuse practices. The base 70 may interlock with an adjoining base 70, by sliding a plurality of male spacers 76C into a plurality of female spacers 76B, on one, or more sides of the base 70. The base 70 may pivot up or down at this joining at an interlock joint 79. The pivoting action allows the base 70 to adjust to the slope of the supporting surface. The base 70 may include a plurality of cut lines 71. The cut lines 71 may be located at the outside edge of the spacers 76A, and the outside edge of the top struts 74A. The plurality of cut lines 71 may run parallel and perpendicular to a perimeter edge of the base 70. The cut lines 71 may be recognizable to the user by measuring a specified distance from the perimeter edge where the female spacers 76B are located. Alternatively, the cut lines 71 may be identified with raised lines, indentations, or any recognizable feature on the intermediate wall 77. The base 70 may be cut at the cut lines 71 with the remaining section maintaining structural integrity. A section of the base 70 may be cut along the cut lines 71 for installation of a vertical fluid conveyance system. The fluid conveyance system projecting up from the sub base with the open top within the base 70 acting as an under drain or over flow drain. The top wall 80 may cover the removed section of base 70 and the drain opening. A horizontal fluid conveyance system may be used with the base 70 by putting an open end of the fluid conveyance system against or near the base 70. The base 70 may also be cut, and the open end of the horizontal fluid conveyance system inserted into the area of the base 70 that was removed. The top wall 80 may cover the cut away area in the base 70. When used in a tree pit or other similar landscape application, the base 70 may be filled with soil, amended soil, or other plant beneficial material. The base 70 may be manufactured so it can be shipped in rolls and unrolled at the installation site.

The top wall 80 as shown in FIGS. 1, 5, 9, 14-16 and 19, may be a flat, rectangular, rigid material with apertures. In this embodiment, the top wall 80 being the upper part of the structural module connecting to, or resting on the intermediate wall 77. The top wall 80 may have a top surface 87 with apertures smaller than the paving material P or aggregate. The paving material P or aggregate may be placed directly on the top wall 80. The top wall 80 restricts the paving material P or aggregate from entering the base 70, while allowing fluids to pass through into the base 70 where the fluids may infiltrate into the ground, and/or be stored until conveyed out. The top wall 80 may allow fluids to pass through from the base 70. The top wall 80 enhances the load bearing capacity of the permeable paving system by spreading the load over a larger footprint than if the load were placed directly on the base 70. Although the top wall 80 in this embodiment is a separate part from the base 70, alternatively the top wall 80 may be manufactured as an integrated unit with the base 70. In an alternate embodiment, the top wall 80 may be used without the base 70. The top wall 80 may connect to an adjoining top wall 80 with male and female connections similar to the connections described for connecting a base 70 to an adjoining base 70. The top wall 80 in this alternate embodiment may have a plurality of guide lines 81 as described in paragraph [0059]. The underside of the top wall 80 resting on a supporting surface. The permeable paving system of this alternate embodiment may also require flexible edging as described in Paragraph [0063] and/or a plurality of screed rail guides 84 and screed rails 85 as described in Paragraph [0066], and/or a plurality of string line posts 112 as described in Paragraph [0067]. The top wall 80 may be manufactured so it can be shipped in rolls and unrolled at the installation site.

Figure 5:
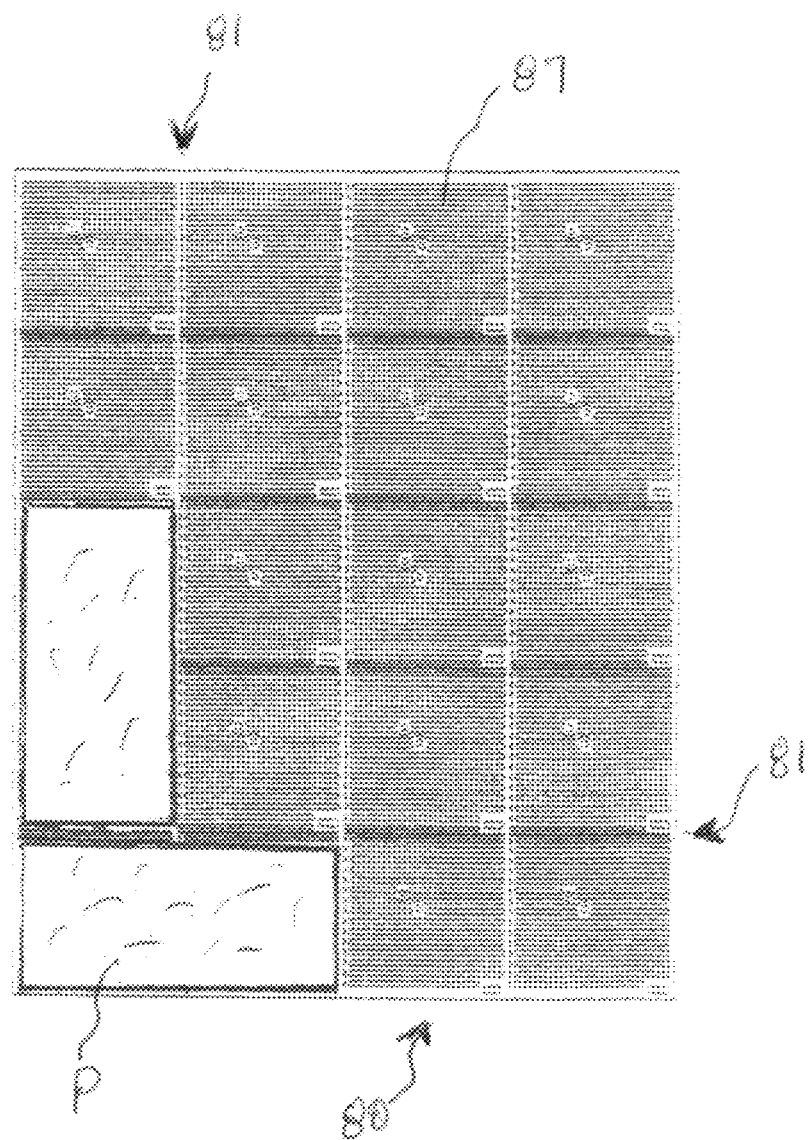
FIG. 5 is a top view of a structural module top wall, including a plurality of guide lines, and a plurality of pavers for a permeable paving system in accordance with one embodiment.
Figure 6:
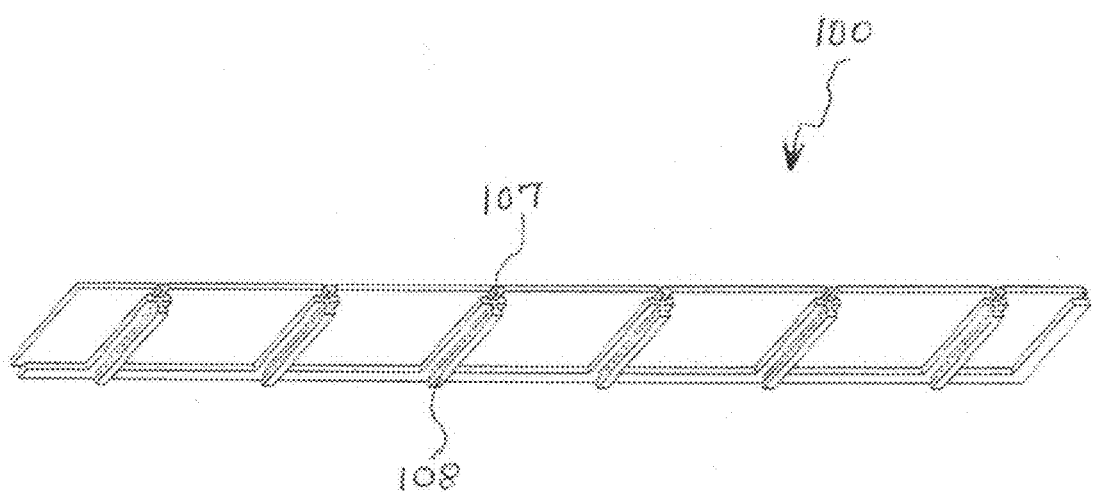
FIG. 6 is a perspective view of an edge cover for a permeable paving system in accordance with one embodiment.
Figure 7:
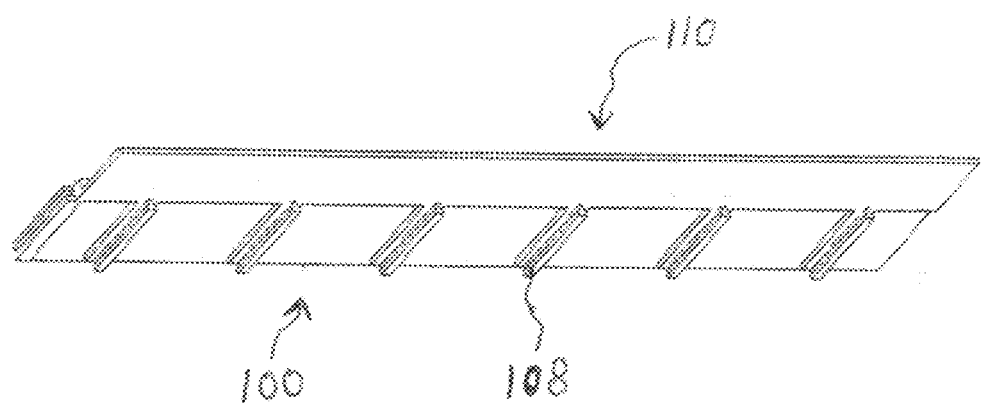
FIG. 7 is a perspective view of an integrated straight edging/edge cover for a permeable paving system in accordance with one embodiment.

The guide lines 81 as shown in FIGS. 1, 5, 9, 14-16 and 19 are visible on the top surface 87 and may be positioned over the cut lines 71. The guide line 81, in this embodiment, may be a plurality of narrow apertures running in a straight line from just inside one edge of the top wall 80 to just short of the opposite edge. The plurality of guide lines 81 may run parallel and perpendicular to a perimeter edge of the top wall 80. The guide lines 81 may be evenly spaced apart, and may form squares on the top wall 80. The guide lines 81 may be used to align pavers running parallel with the perimeter edge, and/or perpendicular to the perimeter edge. As shown in FIG. 5, the user may lay appropriately sized pavers between two parallel guidelines 81, without setting string lines to keep the alignment straight. The user may also align the ends of the pavers, or align pavers running in a perpendicular direction by following the perpendicular guidelines 81, without the need for setting string lines. The guide lines 81 act the same as a string line, without the need to measure both sides of the installation multiple times to find the proper location for driving string line stakes. The guide lines 81 also eliminate the need to connect and tighten the string line multiple times after the stakes are moved and reset. Alternatively, the guidelines 81 may be followed for the setting of traditional string line posts or stakes. The user may establish the location on one side of the installation and may follow the guidelines 81 to the opposite side and set the opposing post without the need to measure for that location. If permeable concrete is being installed, the user may align concrete expansion joints using the guide lines 81. The user may cut along the guide line 81, and along the corresponding cut line 71 to reduce the size of the top wall 80 and base 70 to meet varying site dimensions. Cuts through the top wall 80 at the guide line 81 may leave an inner band in place to maintain the structural integrity of the top wall 80. The guide lines 81 in this embodiment may run almost the full length or width of the top wall 80. Alternatively the guide lines 81 may include and/or consist of aligned apertures, perforations, marks, indentations, connection points, or printed marks or lines on the top wall 80, base 70, edge cover 100, straight edging 110, or flexible edging 50 that give the user points of reference for stretching a string line, setting a laser, or aligning a straight edge to create a straight line for laying the paving material P. The user may alternatively use the "click and drop" method for laying pavers. The user may start in a corner and lay pavers down one edge. The user then moves progressively row by row toward the opposing side. The user may periodically measure from the guide lines 81 to the edge of a row of pavers to check the alignment of the pavers.

The slope dam 75 as shown in FIG. 1 may be used when the permeable paving system is used on a slope, eliminating the need to terrace the sloped terrain. The slope dam 75 in this embodiment is a pipe, but may have other shapes that allow the slope dam 75 to be inserted into an opening in the side edge 73. The slope dam 75 may run from the side edge 73 across the permeable paving system in one continuous piece to the opposing side edge 73. The slope dam 75 may rest on the bottom struts 74B where the slope dam 75 may be connected or fastened. The slope dam 75 may act as a dam to slow down fluids flowing downhill through the base 70. The slope dam 75 may increase the amount of fluids that are infiltrated into the soil and may reduce erosion.

Figure 8:
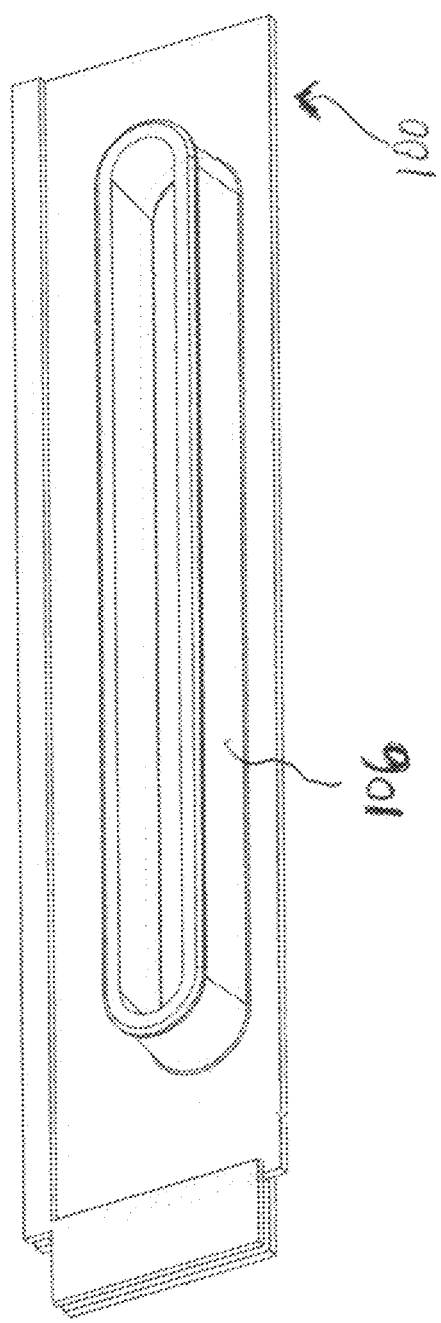
FIG. 8 is a perspective view of an inlet/outlet for a permeable paving system in accordance with one embodiment.

The permeable pavement system may be used with all types of commercial edging, including asphalt, concrete or stone curb, metal edging, or plastic edging etc. In this embodiment, an edge cover 100, as shown in FIGS. 1, 6, 8, 9, 14, and 19, may be a detachable, rigid, flat material with a plurality of female connectors 107 on one side, and a plurality of male connectors 108 on the opposite side. The edge cover 100 may cover the side edges 73, and may separate the base 70 from backfill materials placed around the perimeter of the installation. The edge cover 100 may be connected to the side edges 73 by inserting a plurality of male connectors 108 into the female spacers 76B, or by sliding the plurality of female connectors 107 over the male spacers 76C. The top wall 80 may be installed on the base 70, over the male connectors 108 or female connectors 107. The edge cover 100 may be fastened to the spacers 76A, when the base 70 is cut to a reduced size. The adapter 106 may be included in the edge cover 100 for the conveyance of fluids in or out of the permeable paving system for rainwater harvesting, and/or geothermal heating and/or cooling. As shown in FIGS. 1 and 8, the adapter 106 may be shaped to connect to a commercially available transition adapter model number 1432, manufactured by Advanced Drainage Systems (ADS) with Corporate Headquarters based in Hilliard, Ohio. The adapter 106 may be other shapes to connect to a corresponding shape of the water conveyance system being used.

The straight edging 110, as shown in FIGS. 1, 7, 9, 14, and 19 is a flat, rigid material, integral with the edge cover 100. The straight edging 110 may also be a separate part from the edge cover 100. The straight edging 110, as shown in this embodiment, extends above the top wall 80 and may create separation between the paving material P, aggregate, and the backfill materials around the perimeter of the installation. The straight edging 110 may act as lawn edging when crushed stone or other similar size materials are used as the paving material P. The edging 110 may act as a stay in place concrete form when permeable concrete or similar material is used as the paving material P. The adapter 106 may be installed in the straight edging 110 when needed for conveyance of fluids in or out of the area above the top wall 80. The ADS 1432 transition adapter may connect to the adapter 106 for conveying fluids out of, or into the permeable paving system.

The permeable paver system may also require flexible edging 50, when the area being paved has an edge on a radius. As shown in FIG. 4 of this embodiment, the flexible edging 50 may be an elongate flat strip 52 made from durable and flexible material. A plurality of mounting tabs or flanges 54 extend from the bottom of the flexible edging 50. Each mounting tab 54 includes a mounting hole 55 to secure the edging to the top wall 80 via fasteners. The flexible edging 50 can easily be bent or flexed to match the desired curved contour or radius of the paving material. The flexible edging 50 may be secured in position with fasteners. The fasteners may go through the mounting hole 55, and an aperture in the top wall 80. The fasteners may be configured to catch on the bottom of the top wall 80. The flexible edging 50 may be used in lieu of the straight edging 110.

The following describes how to use the permeable pavement system in this embodiment. The ground is excavated to a predetermined depth in preparation for paving. A layer of base material, such as crushed stone, may or may not be needed, depending on the quality of the sub base soil. A geotextile material, a geogrid, or soil stabilizers such as nylon fibers may be installed on, or mixed in the sub base if needed. The sub base, and the base material, if used, are then compacted and leveled. Once leveled, the plurality of bases 70 is laid, and may be interconnected in the area to be paved. If the permeable paver system is going on a rooftop, or other flat prepared surface, the previous steps are not needed. The base 70 may be cut at the cut lines 71 if the base 70 is too big for the area to be paved. The edge cover 100, if needed, and integral straight edging 110, if needed, is connected to the base 70. The top wall 80 may be cut along the guide lines 81 corresponding to any cuts made in the base 70. The top wall 80 is installed on the base 70. Flexible edging 50, is installed on the top wall 80, if needed. If aggregate is required, the user may mark the location for string lines using the guidelines 81. The aggregate is placed on the top wall 80, leveled, and compacted. The paving material P is placed on the top wall 80, or on top of the aggregate, if used. If the paving material P is pavers, they may be installed directly on the top wall 80 by using the guide lines 81 to align the pavers, or if aggregate is required, the pavers may be aligned by using string lines. All the gaps or joints between the pavers are then filled with stone chips or similar material that is larger than the apertures in the top wall 80. If the paving material P being installed is concrete, the user may align expansion joints by following the guide lines 81. Alternatively, a plurality of bases 70, or plurality of stacked bases 70, may be placed on an impermeable supporting surface with a plurality of top walls 80 installed on the bases 70. A geotextile material may be placed on the top wall 80. A layer of sand or other aggregates may be placed on the geotextile material. The layer of aggregate may be leveled and compacted, and a plurality of bases 70, or a plurality of stacked bases 70 may be placed on top of the aggregate, and a plurality of top walls 80 installed on the plurality of bases 70. Aggregate may be placed on the top wall 80, leveled, and compacted, and a layer of paving material P placed on top of it. The lower level of bases 70 and top walls 80 may act as a fluid storage area, or well for fluid. The fluids in the well may be pumped to a heat exchanger for geothermal heating and cooling, and may be conveyed back to the permeable paving system.

Figure 9:
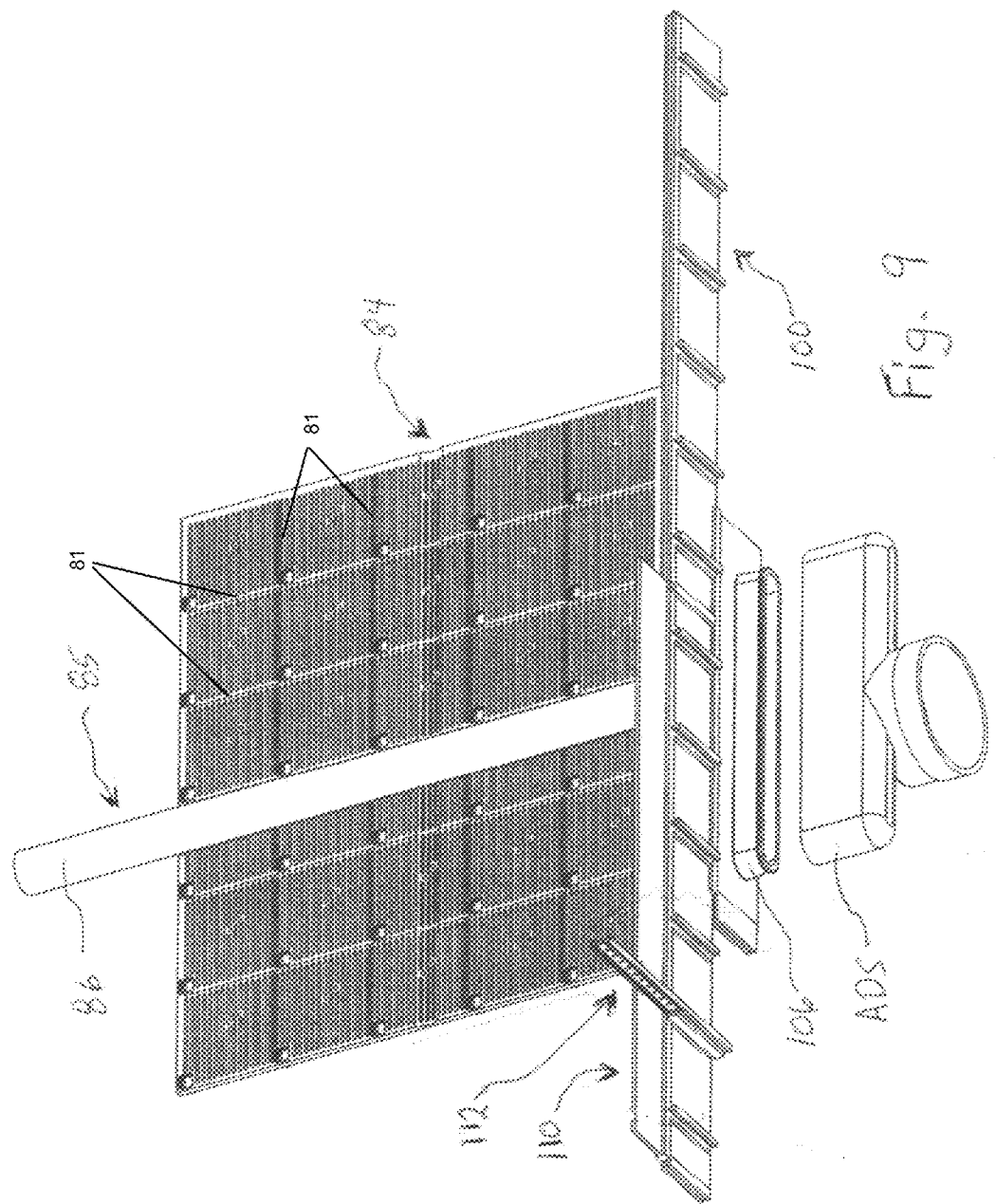
FIG. 9 is a perspective view of a top wall, a screed rail guide, a screed rail, a string line post, an outlet adapter, an ADS transition adapter, an edge cover, and a straight edging for a permeable paving system in accordance with an alternate embodiment.
Figure 10:
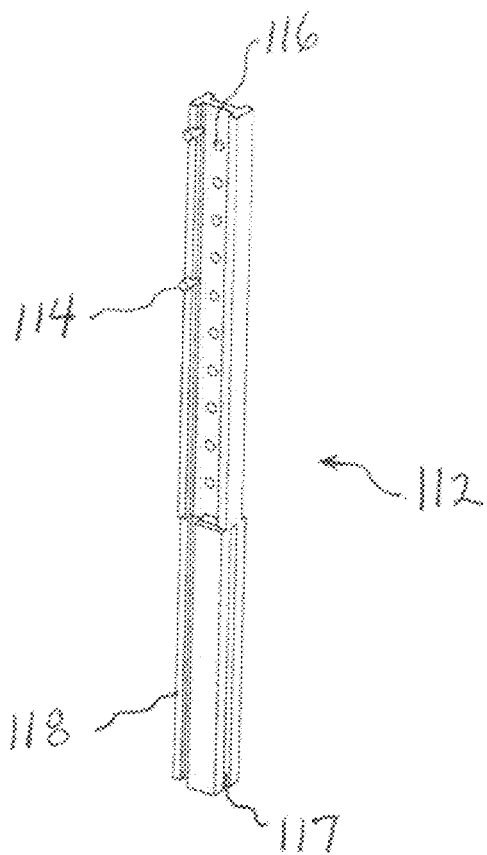
FIG. 10 is a perspective view of a string line post for a permeable paving system in accordance with an alternate embodiment.
Figure 11:
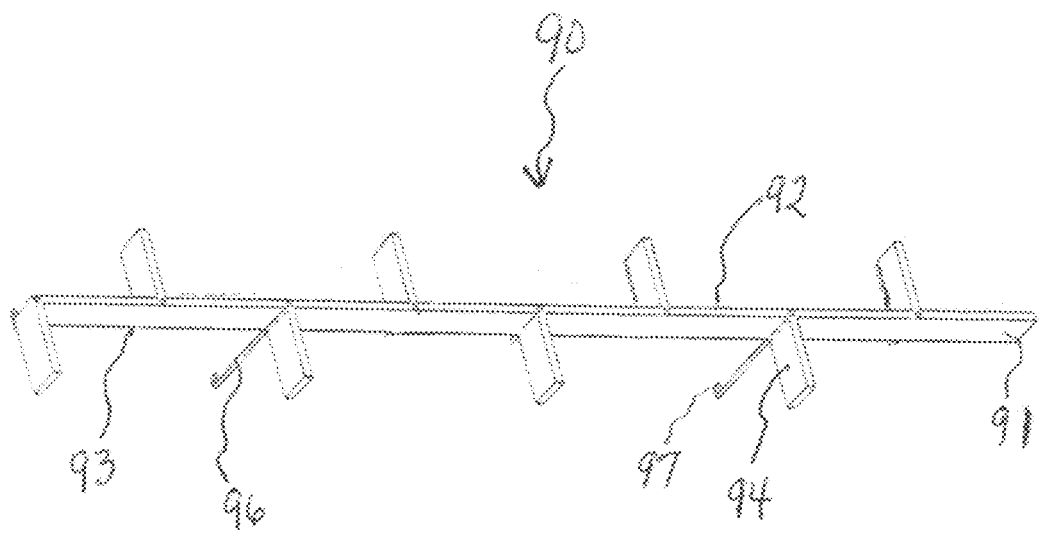
FIG. 11 is a perspective view of a pattern guide in running bond pattern for a permeable paving system in accordance with an alternate embodiment.
Figure 12:
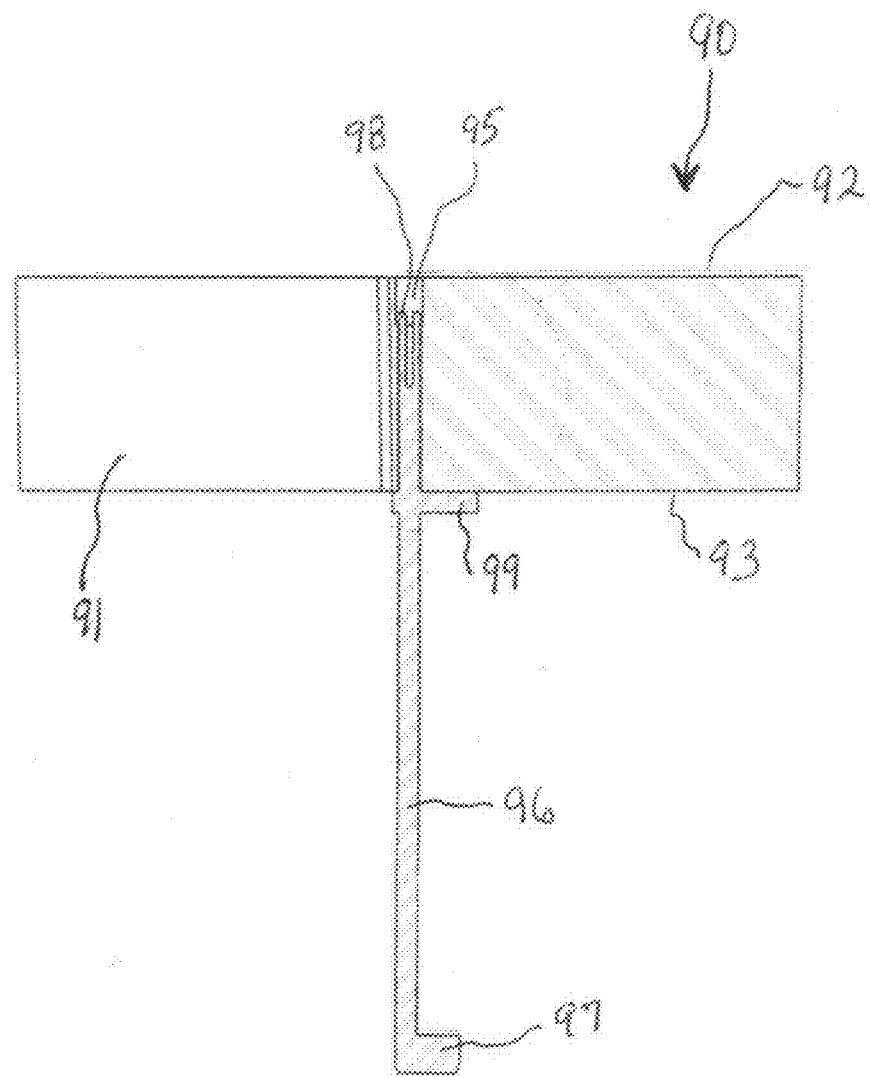
FIG. 12 is a cut away side view of a pattern guide for a permeable paving system in accordance with an alternate embodiment.
Figure 13:
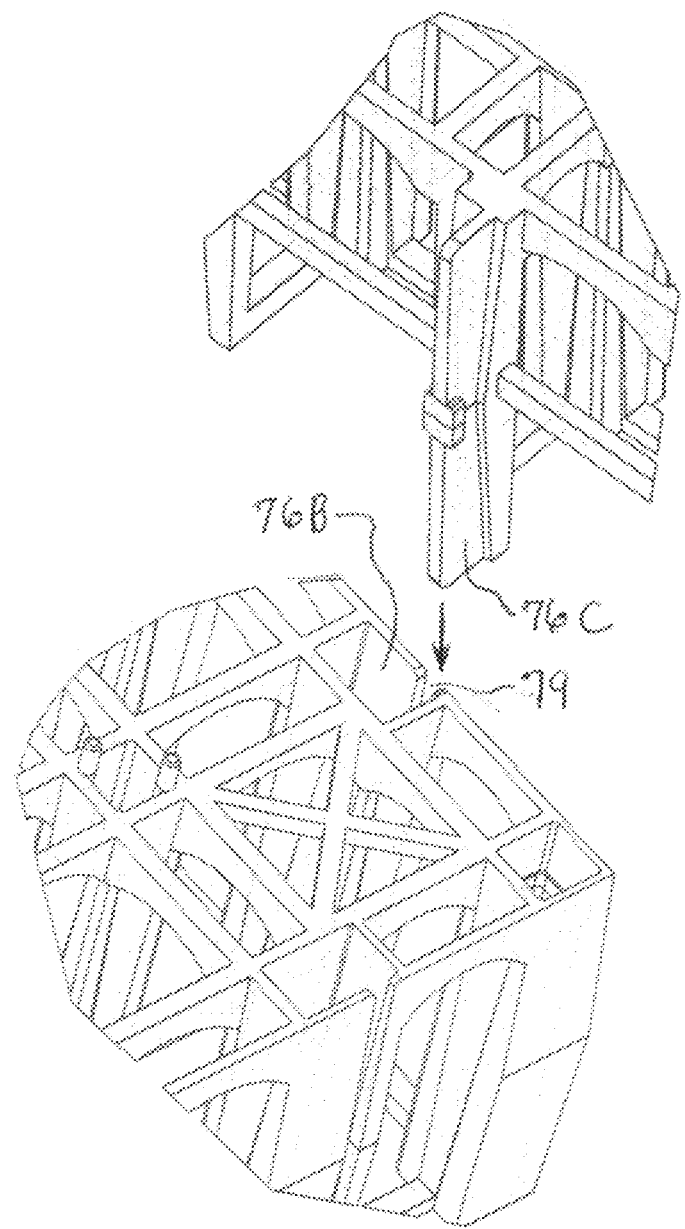
FIG. 13 is a partial perspective view of the interlock joint created by a male interlock spacer and a female interlock spacer for a permeable paving system in accordance with one embodiment.
Figure 14:
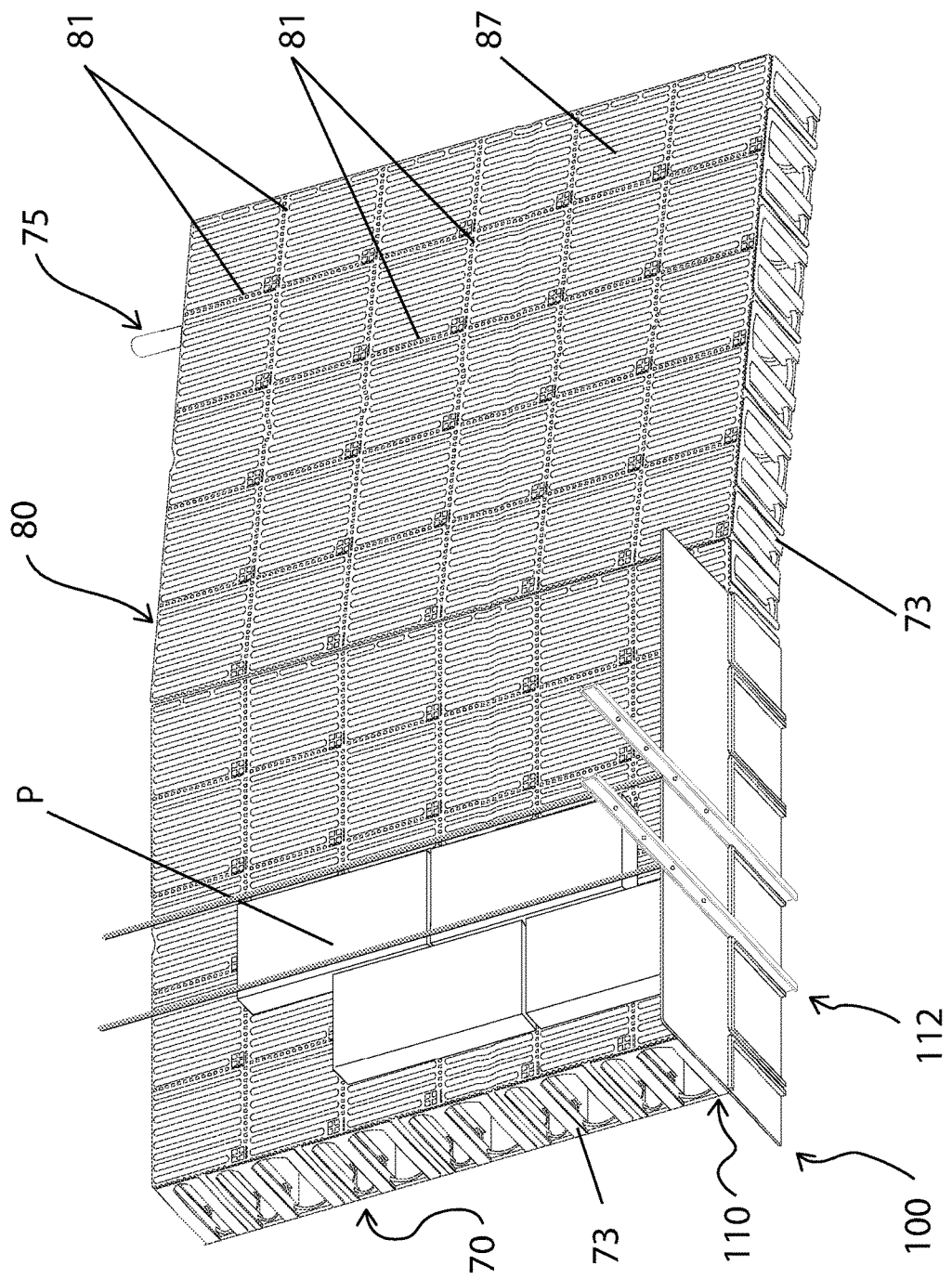
FIG. 14A is a perspective view of a first structural module on a level surface connected to a second structural module on a sloping surface, a plurality of string line posts with attached string lines connected to an edge cover, an integrated straight edging/edge cover for a permeable paving system in accordance with an alternate embodiment.
FIG. 14B is a color version of FIG. 14A.
FIG. 14C is an expanded view of the lower left portion of FIG. 14B, showing the edge cover, straight edging, and string line posts in better detail.
FIG. 14D is an expanded view of the lower right portion of FIG. 14B, showing the guidelines in better detail.
Figure 14:
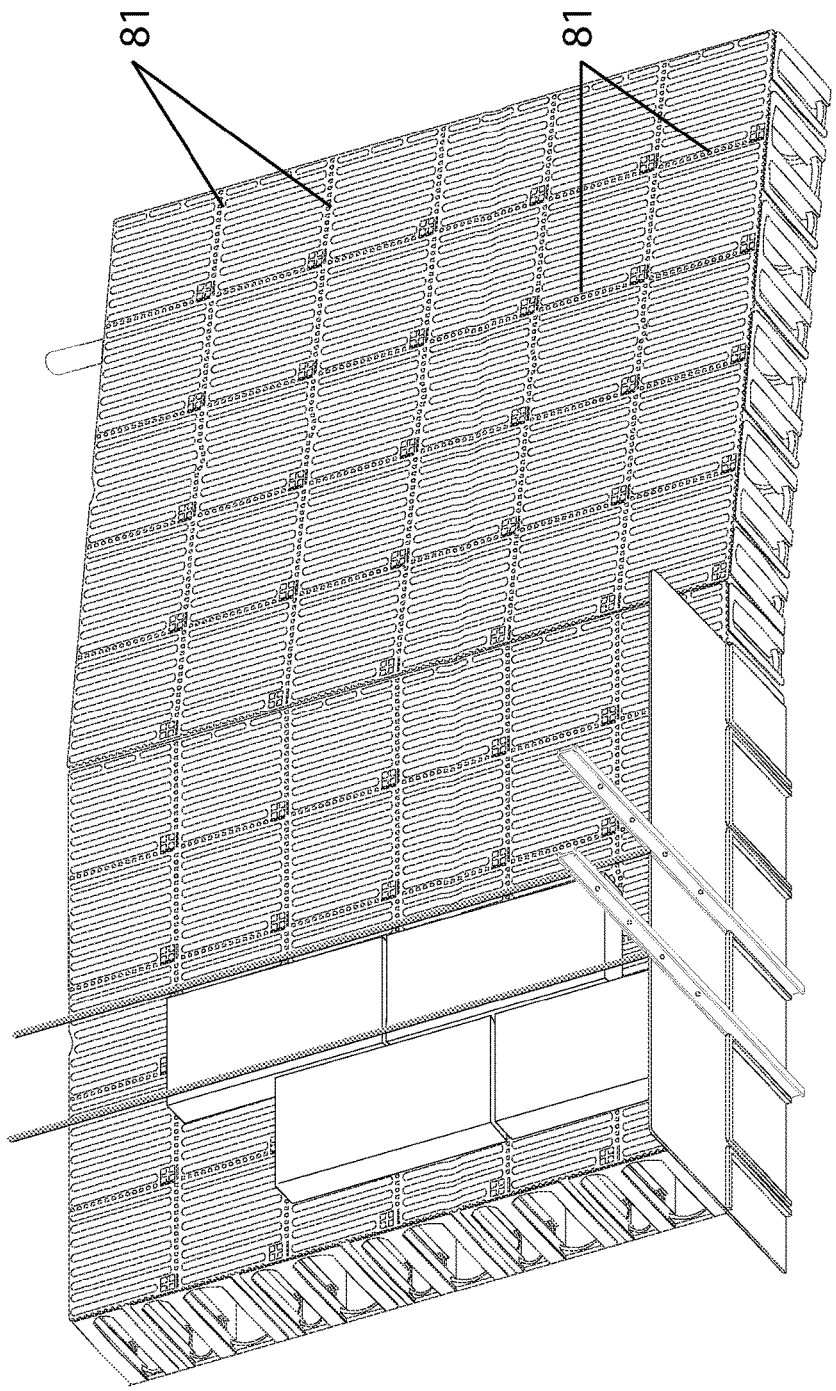
Figure 14:
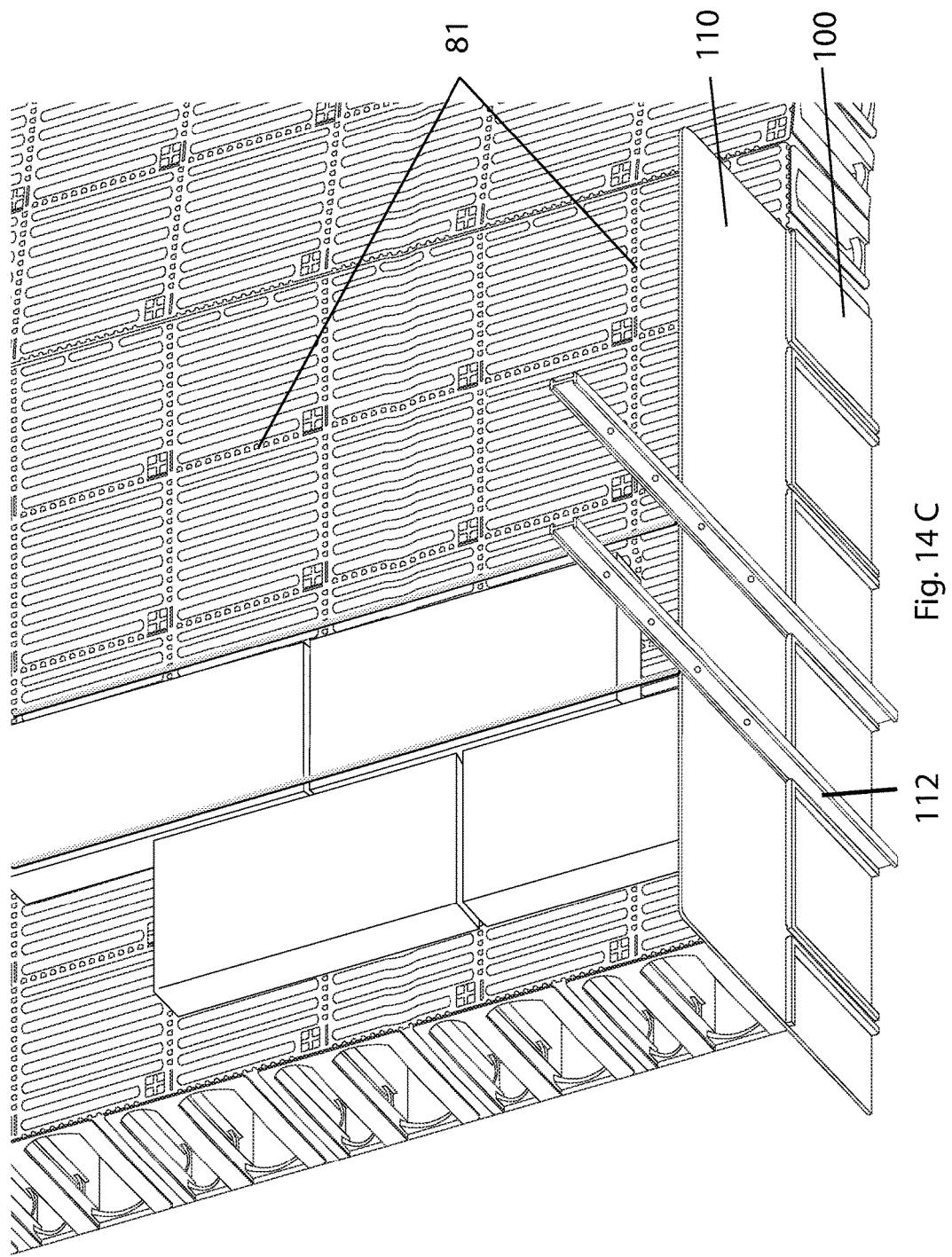
Figure 14:
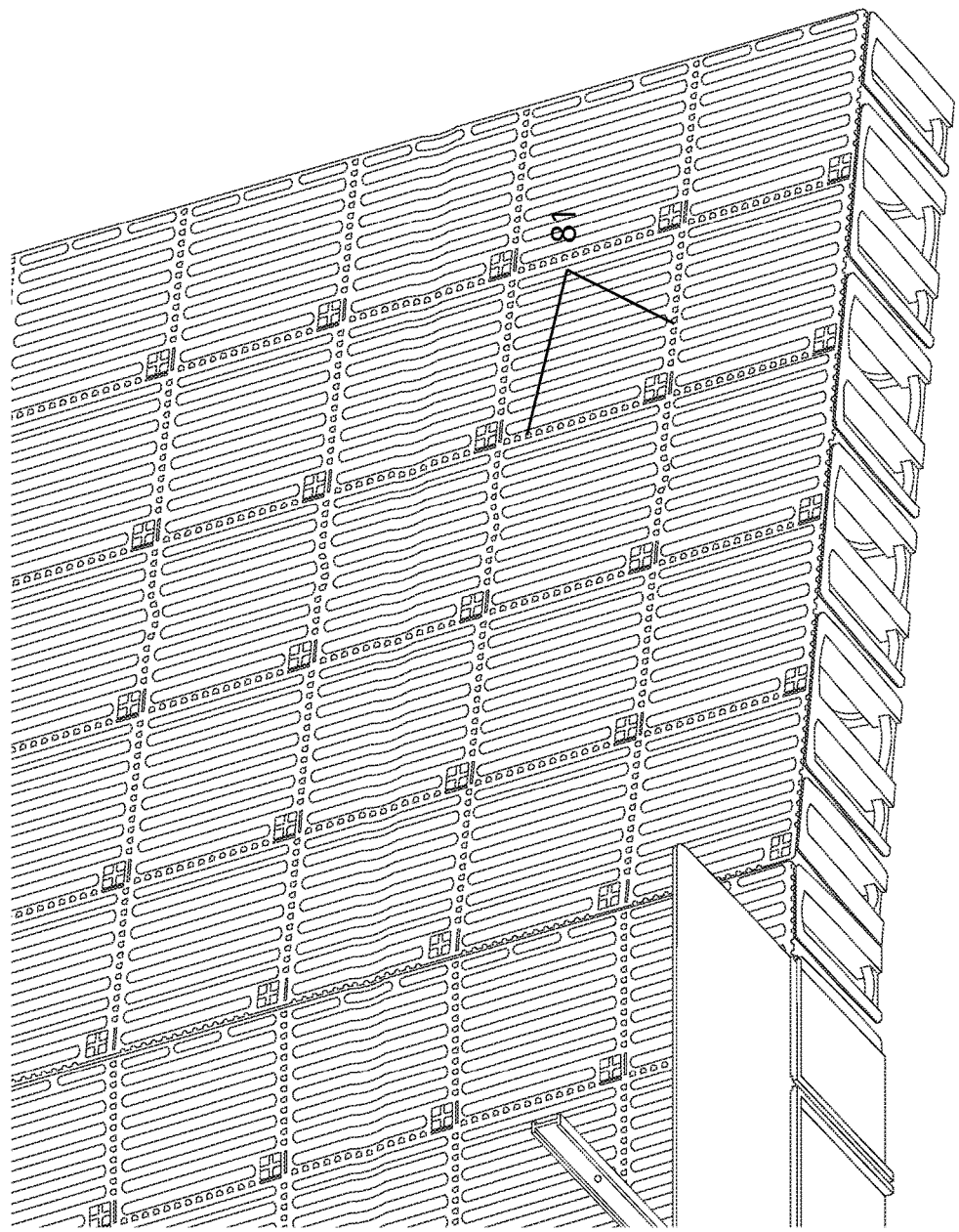
Figure 19:
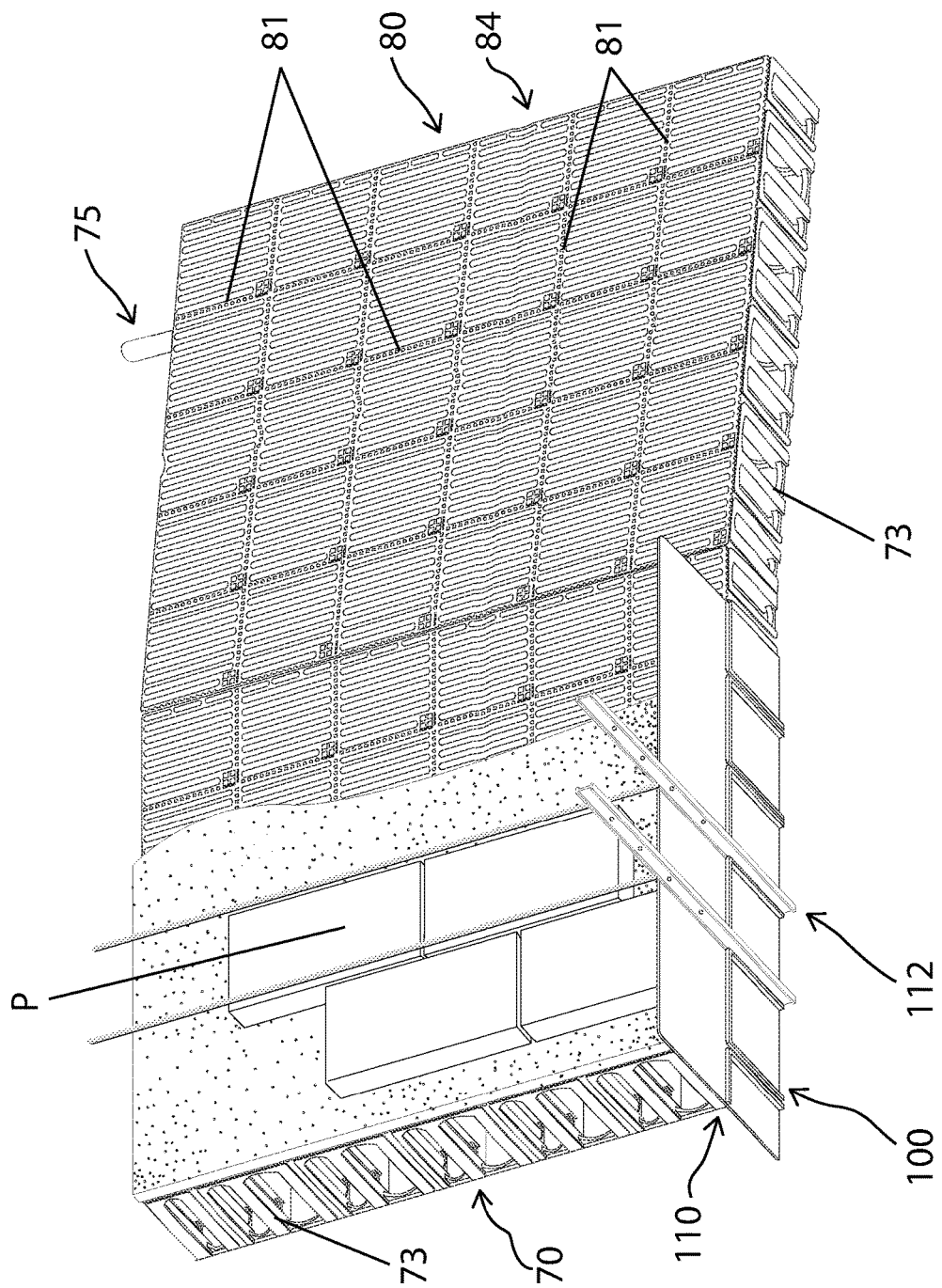
FIG. 19 is a perspective view of a first structural module on a level surface connected to a second structural module on a sloping surface, a plurality of string line posts with attached string lines connected to an edge cover, an integrated straight edging/edge cover with a plurality of pavers resting on an intermediate layer of aggregate for a permeable paving system in accordance with an alternate embodiment.

An alternative embodiment of the permeable paving system as shown in FIGS. 9, 14 and 19 is similar in most respects to the permeable paving system shown in FIG. 1 except for the addition of a plurality of screed rail guides 84, a plurality of screed rails 85, and a plurality of string line posts 112.

In this embodiment, the screed rail 85 as shown in FIG. 9 may be placed in the screed rail guide 84. The screed rail 85 may be round pipe of various materials that lays in the concave radius of the screed rail guide 84. Alternatively the screed rail 85 may rest on the top surface 87. The screed rail guide 84 keeps the screed rails 85 parallel. The height of the screed rail 85 corresponds to the desired thickness of an aggregate material, e.g., crushed stone, crushed glass, etc., to be leveled. The top edge of the screed rail 85 serves as a screed edge 86 for leveling the aggregate. A bar or similar element is laid on the screed edge 86 of two or more screed rails 85 and is moved along the screed edge 86 to level the aggregate material after it is placed on the top wall 80. The screed edge 86 may also be used as a string line would be for aligning the paving material P. The user may measure from the screed edge 86, to the edge of the paving material P to check alignment of the paving material P. Alternatively the screed rail 85 and screed rail guide 84 may be other mating shapes. The aggregate provides support for the paving material P. The aggregate may be sized larger than the apertures in the top surface 87 to restrict the pieces of aggregate from passing through the top wall 80 into the base 70, while allowing fluids to pass through.

The string line post 112 as shown in FIGS. 9, 10, 14, and 19 may be an elongate member extending vertically above the top wall 80. The string line post 112, as shown in this embodiment, may have a post male connector 118 that may be connected to the female connector 107. The post male connector 118 may alternatively connect to the female spacer 76B. The string line post 112 may have a post female interlock 117 that may connect to the male connector 108. The post female interlock 117 may alternatively connect to the male spacer 76C. The string line post 112 may alternatively connect to the base 70, edge cover 100, top wall 80, or straight edging 110, or flexible edging 50 using fasteners. To accommodate various pavement heights, the post 112 may have a plurality of string line holes 116, one over the other, which the user may select from to establish the elevation of the string line. The string line post 112 may have a plurality of tie-off studs 114 that the string line may be attached to. The string line post 112 may be other shapes that connect in a single location, or that connect in a plurality of locations on the base 70, edge cover 100, top wall 80, flexible edging 50, or the straight edging 110. The plurality of string line holes 116 may be in a single vertical row, a plurality of vertical rows, or the plurality of string line holes 116 may be in other configurations. The string line post 112 may also be without string line holes 116, and may be shaped to use other methods of connecting a string line. A product that is currently available is "StringAlong" from Cappuccio Enterprises. StringAlong connects to a commercially available string line post or stake with a fastener, and a string line may be easily connected to the "StringAlong" product. The user may pre mark connection points for the string line post 112 by selecting and marking a location on one side of the installation. The user may then follow the guide lines 81 across to the opposite side and mark that location, eliminating the need to measure each side. Alternatively, a commercially available or homemade string line post or stake may be driven into the ground, and the string line connected to it, or to a product such as the "StringAlong". The user may drive the second post on the opposite side of the installation, after aligning the string line with the guide lines 81. The string line post 112 may be used with or without an intermediate layer of aggregate. The string line post 112 attachment locations may be at the guidelines 81, so that an attached string line between two string line posts 112 will align with the guideline 81. The string line posts 112 with attached string line acting as elevated guidelines 81 for alignment of paving material P when aggregate is placed on the top wall 80.

The steps for using the permeable pavement system as shown in FIGS. 9, 14, and 19 are substantially the same as the steps used for FIG. 1 with the following modifications. After the installation of all the required components, selected from the following; the base 70, the top wall 80, the edge cover 100, the straight edging 110, the adapter 106, and the flexible edging 50, the user may select and mark a plurality of locations for string lines. The user may select and mark one edge of the installation and follow the respective guide lines 81 across the installation, and mark the opposite side. This step may be repeated for setting string lines in a perpendicular direction. The following steps pertaining to the screed rail guides 84 and the screed rails 85 will not be needed if aggregate is not being used, as shown in FIG. 14. Lay at least two screed rails 85 in two parallel guides 84. Place an intermediate layer of aggregate on the top wall 80 in the area where the screed rails 85 are laying in the screed rail guides 84. Place a screed bar on the plurality of screed edges 86. Level the intermediate layer of aggregate by moving the screed bar across the screed edges 86. Move the screed rails 85 by sliding them along the screed rail guides 84 to the next area to be leveled. Remove the screed rails 85 from the screed rail guides 84 after the last area is leveled adjacent the aforementioned screed rail guides 84. Select the next area to be leveled where the screed rails 85 will be laid in two different screed rail guides 84. Remove the screed rails 85 after all areas of the installation have been leveled. All divots left by the screed rail 85 are filled and leveled prior to the placement of the paving material P. Moreover, porous asphalt, permeable concrete, pavers, or any other paving surface may be placed on the intermediate layer of aggregate. The edge cover 100 has male connectors 108 on one side, and female connectors 107 on the opposite side. In this embodiment slide the post male connector 118 into the female connector 107, and on the opposite side of the installation slide the post female connector 117 on the male connector 108. On one side of the installation, insert the string line in the selected hole 116 and secure it to the post 112 at an elevation slightly above the desired elevation of the paving surface P. Move to the other side of the installation and insert the string line in the selected hole 116, pulling the string line tight before securing it to the post 112. If the paving material is pavers, the string line may be used to help align the pavers. Additional string lines may be set parallel and perpendicular to the string line that was set first, using the method described above. The posts 112 with string lines attached may be moved to a new position on the edge cover 100 or base 70 as many times as needed. Remove the posts 112 and the string lines after aligning the paving material P. If the paving material is pavers, fill all the gaps between pavers with stone chips, glass chips, or similar material.

An alternative embodiment of the permeable pavement system is illustrated in FIGS. 11, 12, 15, 16, 17, and 18. The alternative permeable pavement system is similar in most respects to the first embodiment except for the addition of a plurality of pattern guides 90, modifications to the base 70, and modifications to the top wall 80. The base 70 modifications include the addition of a plurality of shelves 72A and the addition of a plurality of lower mounting holes 72B. The top wall 80 modifications include a plurality of handle recesses 82A, and a plurality of upper mounting holes 82B. The string line posts 112 are preferably not used in this embodiment.

In this embodiment the pattern guide 90 as shown in FIGS. 11, 12, 15, and 16, may be an elongated, flat beam 91 with a plurality of dividers or fins 94 extending orthogonal from the flat beam 91. The flat beam 91 may have a guide edge 92, a bottom edge 93, and a plurality of peg holes 95. A plurality of mounting pegs 96 may be inserted into the peg holes 95 through openings visible in the bottom edge 93. The mounting peg 96 may be a round, elongated member. The mounting peg 96 may have a split head 98 with an enlarged section at the end. The enlarged section causing the split head 98 to flex in as it enters the peg hole 95. The split head 98 flexing back out as it reaches an enlarged diameter in the peg hole 95, holding the enlarged section of the split head 98 in the peg hole 95. The mounting peg 96 is able to rotate 360 degrees in this position. The mounting peg 96 may have a handle 99 located just below the bottom edge 93. The handle 99 being an elongated member extending orthogonal to the mounting peg 96. The handle 99 may be used to rotate the mounting peg 96. The distal end of the mounting peg 96 includes a locking extension or leg 97 extending orthogonal to the mounting peg 96. The pattern guides 90 with the bottom edge 93 resting on the top wall 80, may be used to level an intermediate layer of aggregate in a first or initial position. After leveling the aggregate, the user may move the guide 90 to a second raised position where the flat beam 91 and the fins 94 provide the user physical dividers for laying pavers into a pattern. The removal of the pattern guide 90 leaves gaps between the pavers that may be filled with stone chips or similar material that may allow fluids to pass through. In this embodiment, the plurality of dividers 94, and the flat beam 91 together form a running bond pattern, but other patterns such as herringbone or basket weave, and others, may be formed by changing the location of the fins 94. The height of the flat beam 91 corresponds to the desired thickness of aggregate material, e.g., crushed stone, crushed glass, etc., to be leveled. The top edge of the flat beam 91 serves as the guide edge 92 for leveling the aggregate. A bar or similar element is laid on the guide edge 92 of at least two pattern guides 90 and the bar is moved across the guide edges 92 to level the aggregate.

Figure 18:
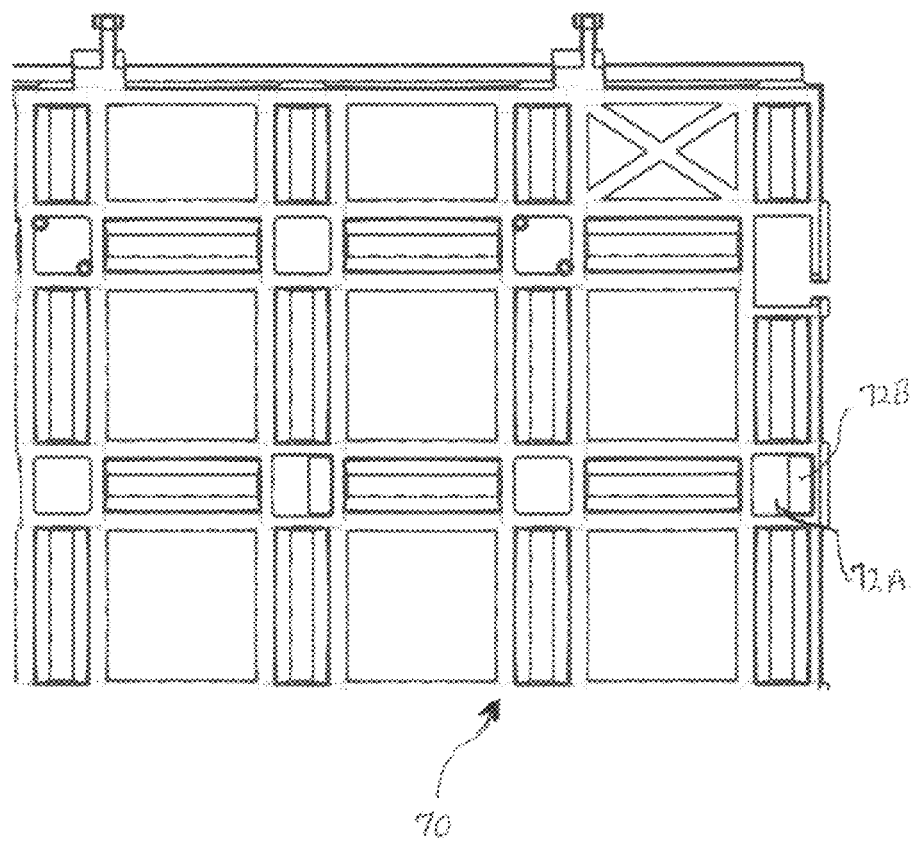
FIG. 18 is a top view of a shelf and a slot for a permeable paving system in accordance with an alternate embodiment.

In this embodiment the base 70 is modified as shown in FIG. 18. The shelf 72A may be a flat, thin material that is recessed in the spacer 76A and molded with, or connected to three walls of the spacer 76A. The top of the shelf 72A being the bottom of a recessed pocket that the bottom of the leg 97 rests on when the pattern guide 90 is in the second raised position. The lower mounting hole 72B may be a rectangular aperture alongside the shelf 72A, and sized to allow the leg 97 to pass through.

Figure 17:
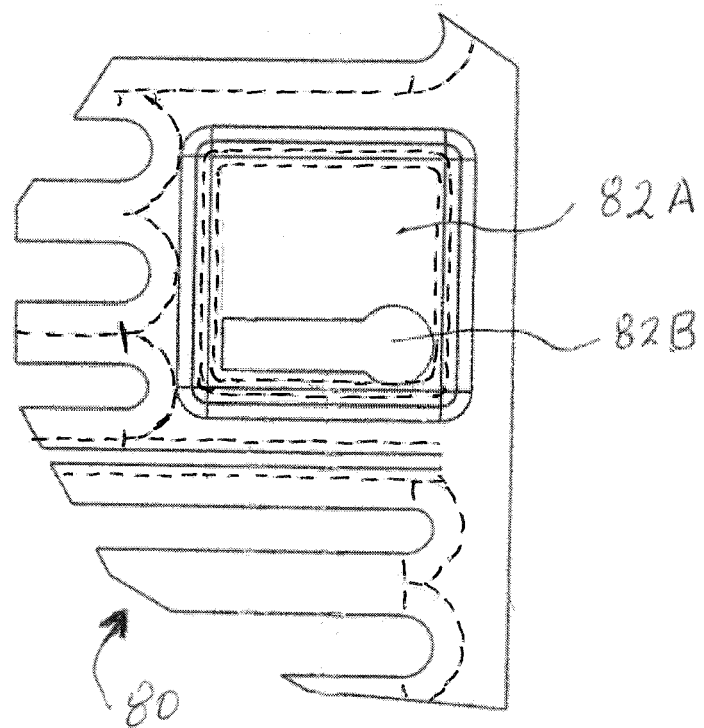
FIG. 17 is a top view of a handle pocket and a mounting slot for a permeable paving system in accordance with an alternate embodiment.

In this embodiment the top wall 80 is modified as shown in FIG. 17. The handle recess 82A may be a square recessed area below the top surface 87. The handle 99 may rest in the handle recess 82A when the pattern guide 90 is in the first or initial position. The bottom side of the handle recess 82A being directly above the shelf 72A, creating the top of the recessed pocket. The top of the leg 97 being against the bottom side of the handle recess 82A when the pattern guide 90 is in the second raised position. The upper mounting hole 82B may be a key hole shaped aperture in the handle recess 82A. The upper mounting hole 82B being positioned above the lower mounting hole 72B in a perpendicular arrangement to the lower mounting hole 72B. The upper mounting hole 82B being positioned to allow the leg 97 to pass through, be turned a quarter turn clockwise, and pass through the lower mounting hole 72B. Thus allowing the bottom edge 93 to rest on the top wall 80 in the first or initial position.

Figure 15:
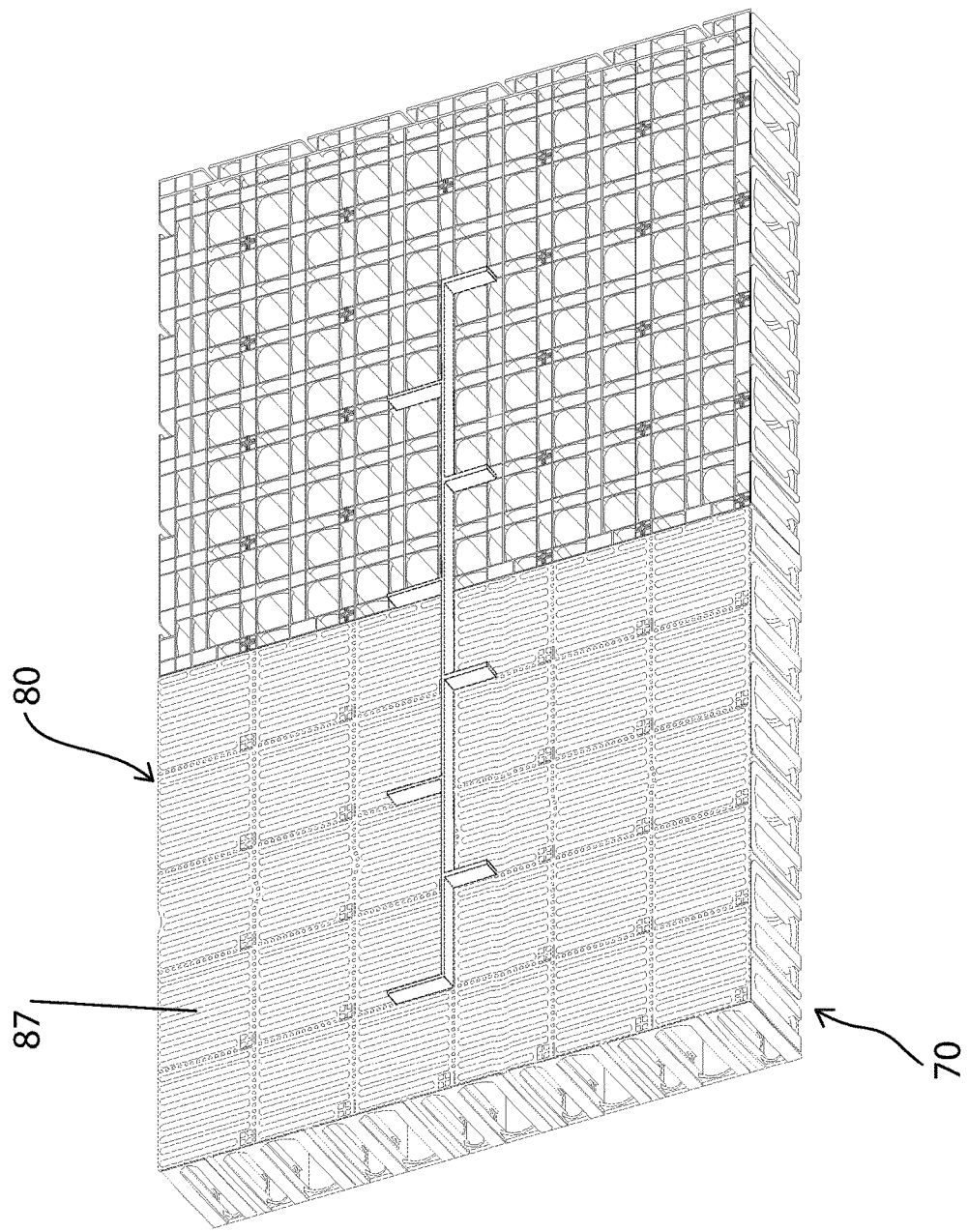
FIG. 15 is a perspective view of a structural module with a guide pattern detachably connected in an initial first position for a permeable paving system in accordance with an alternate embodiment.
Figure 16:
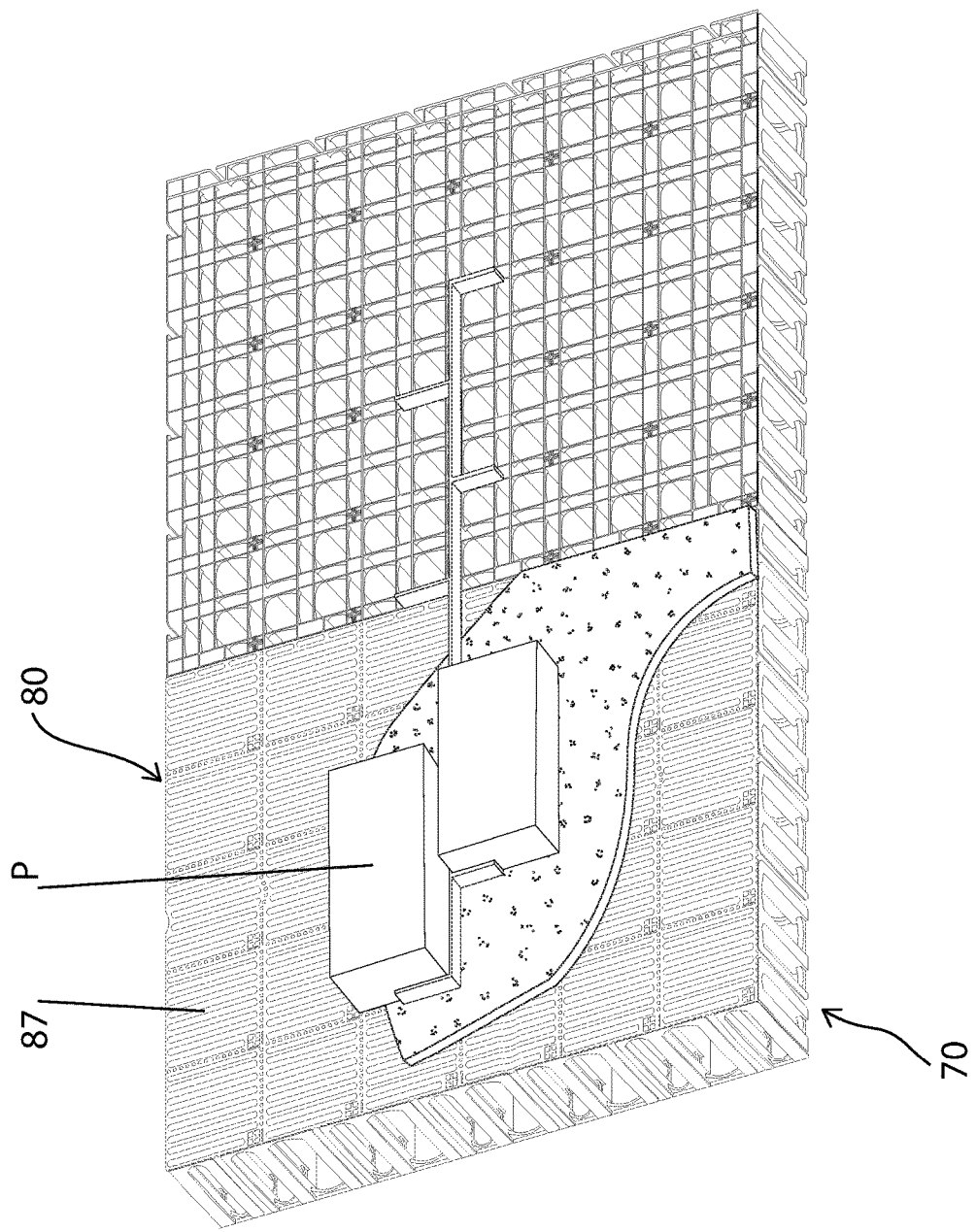
FIG. 16 is a perspective view of a structural module with a guide pattern in a second raised position with a plurality of pavers resting on an intermediate layer of aggregate for a permeable paving system in accordance with an alternate embodiment.

The steps for using the permeable pavement system as shown in FIGS. 15 and 16 are substantially the same as those in FIG. 1, with the following modifications. After the installation of the required components, selected from; the base 70, the top wall 80, the edge cover 100, the straight edging 110, the flexible edging 50, the slope dam 75, and the adapter 106, two or more pattern guides 90 may be placed on the top wall 80. The pattern guides 90 are installed by inserting the leg 97 in the upper mounting hole 82B. The leg 97 is rotated a quarter turn clockwise into, and through the lower mounting hole 72B allowing the pattern guide 90 to rest on the top wall 80. The handle 99 resting in the handle recess 82A. A layer of aggregate is placed on the top wall 80 in the area where the pattern guides 90 are located. A bar or similar element may be pulled across the guide edge 92 of at least two pattern guides 90 to level the bedding layer of aggregate. The pattern guides 90 may be grabbed by the user and pulled up, pulling the leg 97 into, and through the lower mounting hole 72B. The top of the leg 97 will stop on the underside of the handle recess 82A. The user may rotate the leg 97 one eighth of a turn counterclockwise into the recessed pocket created below the underside of the handle recess 82A, and the top of the shelf 72A. The legs 97, engaged in the recessed pocket, holding the pattern guide 90 up in the second raised position. The user may install pavers using the pattern guides 90 to lay the pattern. After laying the pavers, the pattern guides 90 may be removed by turning the leg 97 an additional one eighth of a turn counterclockwise and pulling the leg 97 upward through the upper mounting hole 82B. The pattern guides 90 may be moved to the next area to be leveled. The gaps between the pavers are filled with stone chips or similar material. Alternatively the pattern guides 90 may be removed immediately after the aggregate has been leveled when permeable concrete, porous asphalt or permeable paving other than pavers is used.

It is understood that the present invention is not limited to the embodiments described above, but encompass any and all embodiments within the scope of the following claims.

What is claimed is:

1. A permeable paving system, comprising:
a base layer,
and a layer of paving material,
said base layer comprising a plurality of substantially hollow structural base modules and a plurality of perforated plate modules,
each of said plurality of substantially hollow structural base modules having a rigid horizontally oriented bottom face substantially parallel to a rigid horizontally oriented top face, retained in a fixed space relationship from each other by a plurality of vertically oriented pillars extending between said rigid bottom face and said rigid top face,
and a plurality of vertically oriented side walls extending between respective perimeters of said rigid top face and said rigid bottom face,
the top and bottom faces of each base module having apertures sized to allow unrestricted movement of fluids and aggregate into, and out of a hollow interior of said structural base module,
each of said plurality of perforated plate modules configured to rest directly on top of and attach to a rigid top face of one or more of said plurality of substantially hollow structural base modules thereby distributing a load applied to said perforated plate modules over said hollow structural base modules, said plurality of perforated plate modules each defining a plurality of through-perforations sized to prevent the passage of aggregate but to permit the passage of water into said substantially hollow structural base modules
said base layer configured to rest on a supporting surface,
said supporting surface including any material or combination of materials that provide structural support for said base,
said layer of paving material selected from the group consisting of a permeable rigid pavement, a permeable flexible pavement, a plurality of pavers with a joint filler material, and a plurality of pavers without joint filler material.

2. The permeable paving system of claim 1, wherein said substantially hollow structural base modules are pivotally connectable to adjoining substantially hollow structural base modules in a side wall-to-side wall relationship.

3. The permeable paving system of claim 1, further including an edge cover comprising a flat, rectangular, rigid material connectable to the substantially hollow structural base modules,
wherein the edge cover, when connected to the substantially hollow structural base module, covers the vertically oriented side wall of the substantially hollow structural base module and a corresponding sidewall of the perforated plate module resting thereon along a perimeter thereof.

4. The permeable paving system of claim 3, wherein said edge cover includes an adapter for connecting to a fluid conveyance system.

5. The permeable paving system of claim 3, further including a straight edging comprising a flat, rectangular, rigid material extending above a top surface of said perforated plate modules,
wherein said straight edging is integral with said edge cover,
wherein the straight edging is configured to restrain said layer of paving material from moving outward past an established perimeter of the permeable paving system.

6. The permeable paving system of claim 5, wherein the straight edging includes an adapter for connecting to a fluid conveyance system.

7. The permeable paving system of claim 1, further including a flexible edging comprising:
an elongate, flat rectangular and flexible strip configured to extend vertically above a top surface of said perforated plate modules to accommodate curved edges and straight edges along a perimeter of said layer of paving material, the rectangular strip having a bottom edge; and
a plurality of spaced mounting tabs extending orthogonal to the rectangular strip from the bottom edge, each of the mounting tabs having a mounting hole adapted for securing the flexible edging to said perforated plate modules,
wherein said flexible edging is configured to restrain said layer of paving material from moving outward past an established perimeter of the permeable paving system.

8. The permeable paving system of claim 1, further including a slope dam comprising:
an elongate member sized to fit between parallel rows of said pillars, positioned in the hollow interior of said substantially hollow structural base modules to create a weir within said base layer,
wherein fluids flowing downhill through the substantially hollow structural base modules will be trapped behind the slope dam until overflowing it, being diverted out of the substantially hollow structural base modules, or infiltrating into the supporting surface.

9. The permeable paving system of claim 1 further including a heat source within, below, attached to, or above the substantially hollow structural base modules, said heat source configured to heat the layer of paving material for the melting of ice and/or snow.

10. The permeable paving system of claim 1, wherein a top surface of each of said plurality of perforated plate modules has two sets of perforated parallel lines traversing said top surface, each set of perforated parallel lines perpendicular to a second set of perforated parallel lines, said perforated lines configured to serve as guide lines configured for alignment of the paving material.

11. The permeable paving system of claim 1, wherein said substantially hollow structural base modules are configured to stack on top of one or more substantially hollow structural base modules.

\* \* \* \* \*